(12) United States Patent
Costin et al.

(10) Patent No.: US 6,252,196 B1
(45) Date of Patent: Jun. 26, 2001

(54) LASER METHOD OF SCRIBING GRAPHICS

(75) Inventors: Darryl Costin, Perrysburg; Heath Colwell, Toledo, both of OH (US)

(73) Assignee: Technolines LLC, Cleveland, OH (US)

( * ) Notice: Subject to any disclaimer, the term of this patent is extended or adjusted under 35 U.S.C. 154(b) by 0 days.

(21) Appl. No.: 09/390,956

(22) Filed: Sep. 7, 1999

Related U.S. Application Data

(62) Division of application No. 08/729,493, filed on Oct. 11, 1996, now Pat. No. 5,990,444.
(60) Provisional application No. 60/102,525, filed on Sep. 30, 1998.

(51) Int. Cl.[7] .................................................. B23K 26/00
(52) U.S. Cl. ................. 219/121.69; 219/121.61; 219/121.68
(58) Field of Search .................. 219/121.6, 121.61, 219/121.65, 121.66, 121.67, 121.68, 121.69, 121.72, 121.78, 121.8; 8/444; 347/253; 430/20

(56) References Cited

U.S. PATENT DOCUMENTS

| | | |
|---|---|---|
| 3,523,345 | 8/1970 | Hughes . |
| 3,720,784 | 3/1973 | Maydan et al. . |
| 4,122,240 | 10/1978 | Banas et al. . |
| 4,271,568 | 6/1981 | Durville et al. . |
| 4,564,739 | 1/1986 | Mattelin . |
| 4,589,884 | 5/1986 | Gilpatrick . |
| 4,629,858 | 12/1986 | Kyle . |
| 4,680,032 | 7/1987 | Arnott . |
| 4,680,034 | 7/1987 | Arnott . |
| 4,780,590 | 10/1988 | Griner et al. . |
| 4,814,259 | 3/1989 | Newman et al. . |
| 4,847,184 | 7/1989 | Taniguchi et al. . |
| 5,017,423 | 5/1991 | Bossmann et al. . |
| 5,171,650 | 12/1992 | Ellis et al. . |
| 5,185,511 | 2/1993 | Yabu . |
| 5,200,592 | 4/1993 | Yabu . |
| 5,262,613 | 11/1993 | Norris et al. . |
| 5,341,157 | 8/1994 | Campagna et al. . |
| 5,404,626 | 4/1995 | Bylund et al. . |
| 5,567,207 | 10/1996 | Lockman et al. . |
| 5,990,444 | * 11/1999 | Costin ........................ 219/121.69 |
| 6,002,099 | * 12/1999 | Martin et al. ................ 219/121.69 |

FOREIGN PATENT DOCUMENTS

| | | |
|---|---|---|
| 3916126 | 1/1990 | (DE) . |
| 3698302 | 5/1994 | (FR) . |
| 59-106560 | 2/1982 | (JP) . |
| 1-95885 | 4/1989 | (JP) . |
| 3-45578 | 2/1991 | (JP) . |
| 5-138374 | 6/1993 | (JP) . |

* cited by examiner

Primary Examiner—Geoffrey S. Evans
(74) Attorney, Agent, or Firm—Scott C. Harris, Esq

(57) ABSTRACT

A laser method scribes graphics on materials. The method relates to the identification and understanding of a new energy measurement called energy density per unit time, and the identification and simultaneous control of the laser operating parameters which influence this energy measurement. Once a range of energy density per unit time is determined for scribing a desired graphic on a given material, the energy density per unit time can be controlled to stay within that range to achieve desired results in a repeatable fashion. In a preferred embodiment, the invention relates to a method of scribing graphics on fabric, leather and vinyl materials. In this embodiment, the energy density per unit time can be controlled to substantially avoid complete carbonization, melting and/or burnthrough of the material.

16 Claims, 25 Drawing Sheets

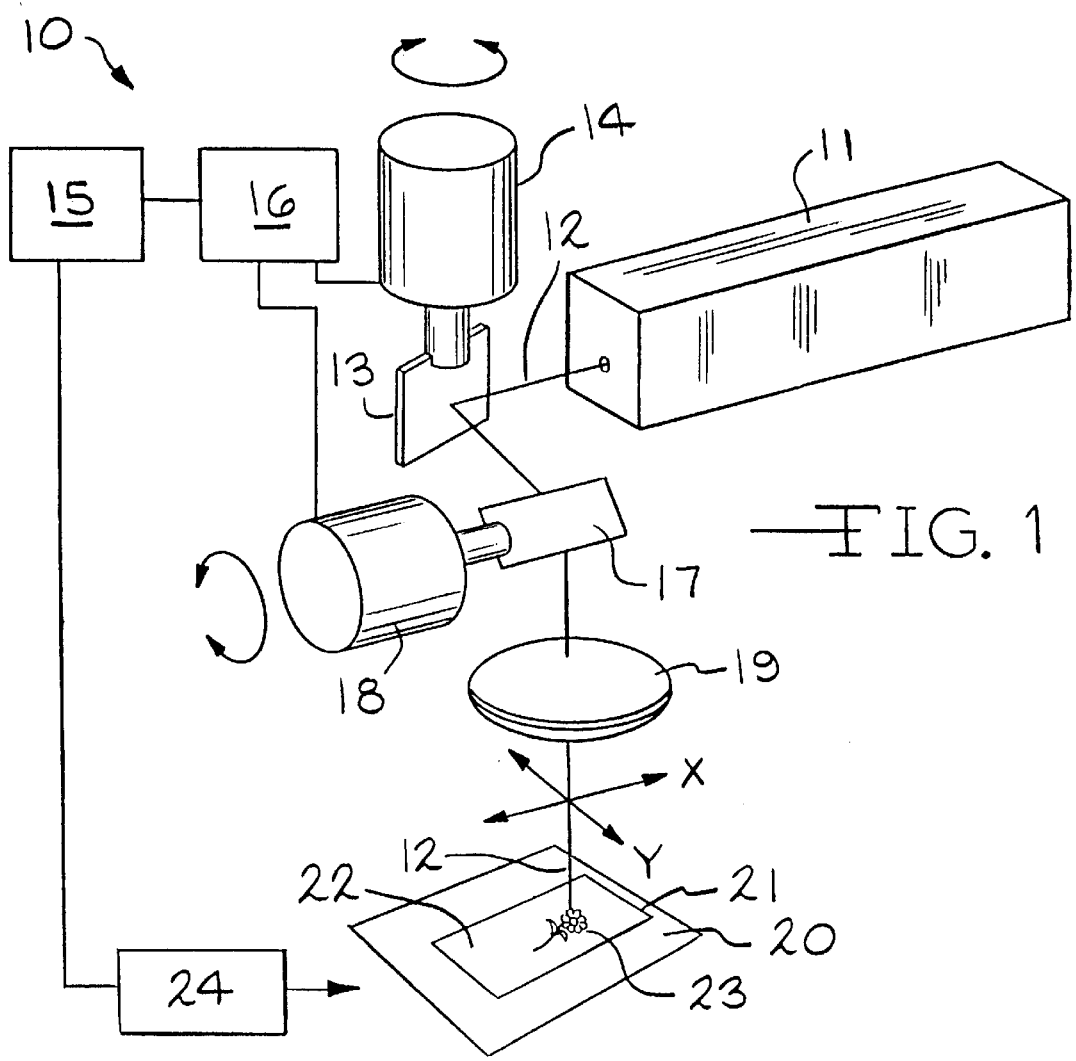
FIG. 1
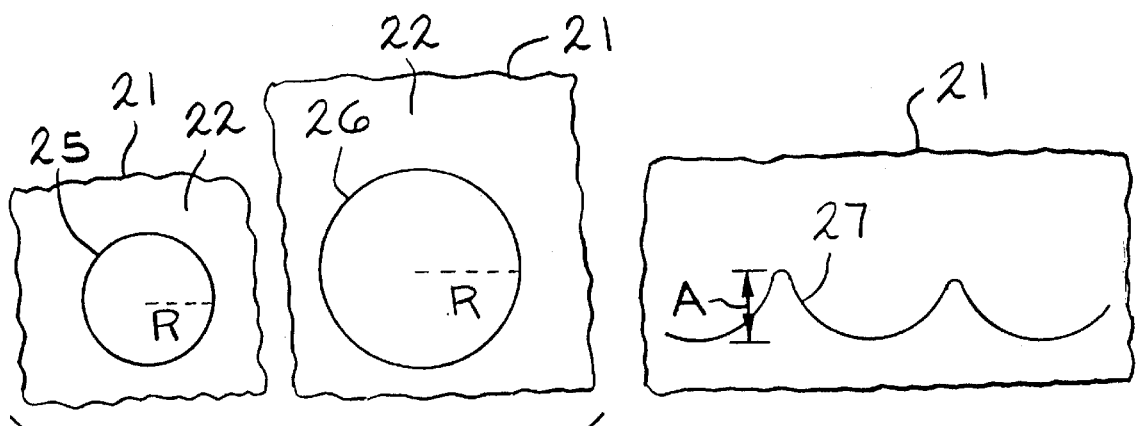
FIG. 2
FIG. 3

LASER METHOD OF SCRIBING GRAPHICS

CROSS-REFERENCE TO RELATED APPLICATION

This is a Divisional of U.S. application Ser. No. 08/729,493 filed Oct. 11, 1996, now U.S. Pat. No. 5,990,444 and claims benefit of Provisional No. 60/102,525 filed Sep. 30, 1998.

BACKGROUND OF THE INVENTION

This invention relates in general to a laser method of scribing graphics on materials including fabrics, leathers, vinyls, rubber, wood, metals, plastics, ceramics, glass and other materials (hereinafter collectively referred to as the "materials"). The term "scribe", as used herein, means to contact the material with a laser beam to form a graphic. The term "graphic", as used herein, refers to decorative and artistic designs, nondecorative designs, patterns, graphic images, looks such as a sandblasted look, a stonewashed look and a frayed look, alphanumeric characters, logos, other identification, and any other visual composition scribed by the laser on a material. In a preferred embodiment, this invention relates to a laser method of scribing graphics on fabrics, leathers and vinyls.

Materials have commonly been used to make, without limitation, clothing, linens, footwear, belts, purses and wallets, luggage, vehicle interiors, furniture coverings, wall coverings and many other manufactured goods. Graphics have been formed on these materials to give them a unique and attractive appearance.

The typical methods of forming graphics on materials are various methods of dyeing, printing, weaving, embossing and stamping. Unfortunately, such methods are very costly in terms of capital investment and operating cost, and they are often plagued with environmental problems.

Complex and intricate graphics are often more attractive than simple graphics. However, there has previously been no cost efficient method of forming complex and intricate graphics on the materials. Most of the previous methods lack the necessary registration and precision to insure that minute details of the graphics are accurately and repeatably presented on the materials.

Lasers have been used in the fabric industry to cut fabrics into separate pieces. They have also been used to engrave designs on carpets, and to fix dyes or heat treat unbleached or bleached goods so as to impart improved adhesion properties. However, in the past, certain technical barriers have prevented the use of lasers to form graphics on fabric, leather and vinyl materials. When such use was attempted, the laser beam caused complete carbonization, burnthrough and/or melting at the point of contact. This resulted in burning, complete penetration and/or the formation of an undesirable hole or defect in the material.

If the technical barriers could be overcome, a laser would be a desirable method of forming graphics on materials. For one thing, a laser is well adapted for forming complex and intricate graphics on materials with precision and repeatability. Moreover, laser manufacturing methods are speedy and cost efficient, and they do not cause environmental problems. Thus it would be desirable to provide a suitable method of using a laser to form graphics on materials.

SUMMARY OF THE INVENTION

This invention relates to a unique laser method of scribing graphics on materials. In the method, a laser beam contacts a material and alters the physical and/or chemical properties of the material to scribe a graphic. The keys to the invention are: 1) the identification and understanding of a new energy measurement called Energy Density Per Unit Time (hereinafter referred to as "EDPUT"), and 2) the identification and simultaneous control of the laser operating parameters which influence EDPUT. Once a range of EDPUT is determined for scribing a desired graphic on a given material, the EDPUT can be controlled to stay within that range to achieve desired results in a repeatable fashion. In a preferred embodiment, the invention relates to a method of scribing graphics on fabric, leather and vinyl materials. In this embodiment, the EDPUT can be controlled to substantially avoid complete carbonization, melting and/or burnthrough of the material. Thus, the invention can overcome the technical barriers which have prevented the use of lasers to scribe graphics on such materials in the past.

The operating parameters include the continuous power of the laser beam, the area of the spot formed by the laser beam on the material, and the speed of the laser beam relative to the surface of the material. These parameters each and in an interactive manner influence the EDPUT which is the critical factor to eliminate complete carbonization, burnthrough and/or melting, yet produce a visible graphic on the material. If the EDPUT is too large, the laser will carbonize, burn through or melt through the material. Conversely, if the EDPUT is too small, the graphic scribed onto the material will not be sufficiently visible. Preferably, EDPUT is defined as follows:

$$\text{EDPUT (watts-sec/mm}^3\text{)} = \left(\frac{\text{Continuous Power (watts)}}{\text{Area of Spot (mm}^2\text{)}}\right)\left(\frac{1}{\text{Speed (mm/sec)}}\right)$$

It was found that the preferred EDPUT was different for different types of materials, and was often different for different colors and weights of material. Further, it was found that the preferred EDPUT was often different for different types and sizes of graphic scribed onto the material. This invention then teaches the importance of identifying and simultaneously controlling several laser operating parameters together so as to achieve an EDPUT which produces the desired results each and every time.

Accordingly, this invention teaches the use of a variable power laser such that the continuous power can be ratcheted down or up to certain levels. Previous literature typically refers to the use of a laser having a specific power output, for example a 75 watt YAG laser or a 25 watt $CO_2$ laser. In contrast, this invention teaches to control the continuous power and other variables simultaneously and within specific limits so that the EDPUT is within a range to produce the desired results. Consequently, although a 25 watt $CO_2$ laser was used in experiments relating to this invention, the continuous power was controlled such that power levels between 0.25 and 25 watts were achievable.

This invention also introduces a way to influence the EDPUT by changing the area of the spot formed on the material by the laser beam. Typically, previous literature refers to focused laser radiation. However, it was found that the area of the spot can be increased and the EDPUT reduced by defocusing the laser beam both at distances greater than and less than the focus distance between the laser lens and the material. The invention also teaches how to produce specific graphics by oscillating the laser beam along a waveform such as a sawtooth or semicircle. In several cases, the best way to achieve desired results was by oscillating the laser beam at distances which were out of focus.

New graphics can be imparted onto materials at the point of sale retail location, wholesale warehouse or manufacturing plant which are not possible by any other means, thereby creating new products with expanded market opportunities. In particular, a variety of desirable graphics can be produced on denim fabric and on leather/vinyl by the laser method of the invention. The graphics on denim fabric include, without limitation, graphic images, logos and identification, a sandblasted look, a stonewashed look, a frayed look, a threadbare look and a stitched look. Intricate laser induced graphics can be imparted onto leather and vinyl where unique graphics are seldom found. The graphics on leather and vinyl include, without limitation, graphic images, a tufted look, a hand sewn look, and logos and identification.

The products made by this method maintain the quality of the graphic following repeated washings. In some experiments, it was found that graphics were visible before washing (particularly for denim), but following one or repeated washings the graphic either faded away or caused tears in the material. It was particularly critical then to: 1) conduct computer designed experiments to identify the specific combination of laser operating parameters which produced the desired EDPUT, and 2) evaluate the graphic following several washings.

The laser method of this invention can be used to impart identification unique to each piece of material. The registration and precision necessary to repeatedly scribe alphanumeric characters on a garment or piece of goods can be controlled very accurately, once the preferred EDPUT is identified and controlled for that material and type of identification. Further, the computer can be programed to increment the identification number by one so that the shoes, jeans, shirts, or other garment or goods can be quickly and uniquely identified in a somewhat automatic manner by simply positioning the first piece under the laser and pressing the start button, positioning the second piece under the laser and pressing the start button, etc. This technology can then find wide application in garment or goods identification for inventory control, quality control, counterfeiting prevention and product labeling.

The graphics can be produced on materials very cost efficiently with modern automatic laser systems. The EDPUT for the particular kind of material and graphic can be easily controlled by computer. The laser method of forming graphics avoids the costs associated with a heavy investment in capital equipment and environmental protection equipment. No preprocessing of the material such as soaking or spraying is required prior to scribing with the laser beam.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a schematic view of a preferred embodiment of a laser method of forming graphics on materials in accordance with this invention.

FIG. 2 is an enlarged schematic view of a first spot formed by the laser beam on the material when the laser beam is in focus, and a second spot formed by the laser beam on the material when the laser beam is out of focus.

FIG. 3 is an enlarged schematic view of an oscillated laser beam.

FIG. 7 is a drawing of a graphic image formed on denim.

FIG. 8 is a photograph of a sandblasted look formed on denim.

FIG. 11 is a drawing of laser lines of ever increasing width and decreasing spacing used to form the sandblasted look.

FIG. 12 is a photograph of a stonewashed look formed on denim.

FIG. 13 is a drawing of a frayed look formed on denim shorts.

FIG. 14 is a drawing of a thread barren look formed on denim shorts.

FIG. 15 is a drawing of a logo design formed on denim jeans.

FIG. 16 is a drawing of a stitched design formed on denim.

FIG. 17 is a drawing of a plaid look formed on denim.

FIG. 18 is a drawing of a polka dot look formed on denim.

FIG. 19 is a photograph of a moire look formed on denim.

FIG. 20 is a photograph of a crazy lines look formed on denim.

FIG. 21 is a drawing of a graphic image formed on leather.

FIG. 22 is a plan view of a tufted look formed on leather.

FIG. 23 is a cross-sectional view of the tufted look taken along line 23–23 of FIG. 22.

FIG. 24 is a drawing of a hand sewn look formed on leather.

FIG. 25 is a drawing of a relief look formed on polyester.

FIG. 26 is a drawing of laser lines formed on bleached cotton fabric before dyeing the cotton fabric.

FIG. 27 is a drawing of the laser lines of FIG. 26 after the cotton fabric is dyed.

FIG. 28 is a photograph of a sandblasted look formed on denim by use of reducing area stencils.

FIG. 29 is a drawing of a colored design formed on cotton fabric.

FIG. 30 is a drawing of a graphic formed on denim, including thick and thin, continuous and discontinuous, and straight and curved lines.

FIG. 34 illustrates a method in which the laser is moved to control the speed of the laser beam relative to the surface of the material.

FIG. 35 illustrates a method in which the material is moved to control the speed of the laser beam relative to the surface of the material.

FIG. 36 illustrates a method in which both the laser and the material are moved, and specifically where the material is positioned on a moving roll.

FIG. 37 illustrates a method in which a mirror is moved to direct the laser beam onto the surface of the material.

FIG. 38 illustrates a method in which a mirror is moved to direct the laser beam onto the surface of the material, and where the material is positioned on a moving roll.

FIG. 39 illustrates a method in which a main mirror and a plurality of secondary mirrors are moved to direct the laser beam onto the surface of the material.

FIG. 40 illustrates a method in which a main mirror and a plurality of secondary mirrors are moved to direct the laser beam onto the surface of the material, and where the material is positioned on a moving roll.

FIG. 41 illustrates a method in which a shutter periodically interrupts the laser beam to form a discontinuous design on the surface of the material.

FIG. 42 illustrates a method in which a lens is moved to direct the laser beam onto the surface of the material, and in which a shutter periodically interrupts the laser beam to form a discontinuous design on the surface of the material.

FIG. 43 illustrates a method in which the laser is positioned on a robot arm so that the robot can be used as the x-y device to scribe a graphic onto a stationary or moving material.

DETAILED DESCRIPTION OF THE PREFERRED EMBODIMENT

Figure 4:
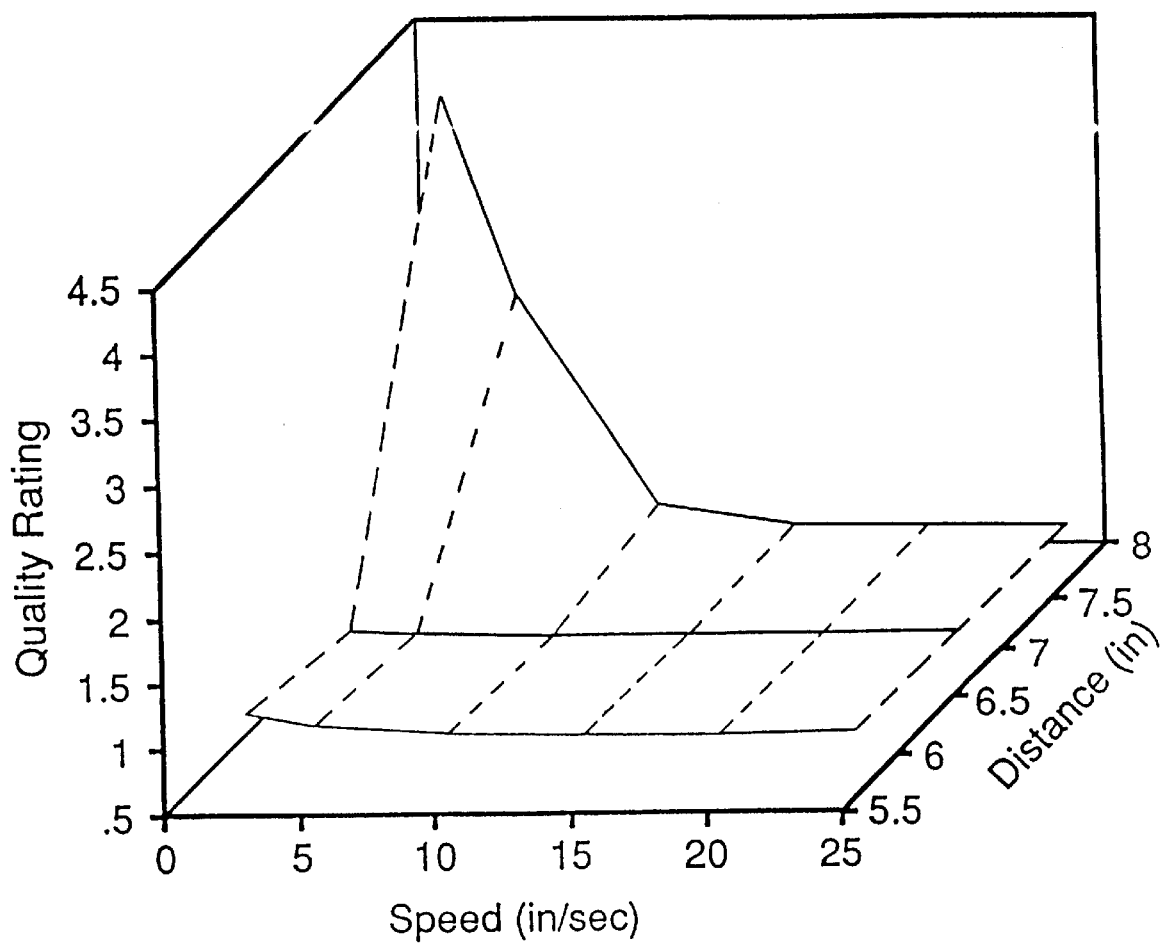
FIGS. 4–6 are graphs showing the results of experiments where a solid graphic was scribed on denim and the graphic was evaluated.

Referring now to the drawings, there is illustrated in FIG. 1 a preferred laser method of scribing graphics on materials in accordance with this invention. The method utilizes the apparatus indicated generally at 10. The apparatus includes a laser 11 which can be adjusted for different power outputs. A preferred laser 11 is a Stylus $CO_2$ laser manufactured by Excel/Control Laser, 7503 Chancellor Drive, Orlando, Fla. 32809.

The laser 11 generates a laser beam 12 in the direction of a computer numerically controlled mirror system. The mirror system includes an x-axis mirror 13. The x-axis mirror 13 is mounted on an x-axis galvanometer 14. The x-axis galvanometer 14 is adapted to rotate to cause rotation of the x-axis mirror 13. Rotation of the x-axis mirror 13 causes movement of the laser beam 12 along the x-axis. A numerical control computer 15 controls the output of a power source 16 to control rotation of the x-axis galvanometer. The laser beam 12 is deflected by the x-axis mirror 13 and directed toward a y-axis mirror 17. The y-axis mirror 17 is mounted on an y-axis galvanometer 18. The y-axis galvanometer 18 is adapted to rotate to cause rotation of the y-axis mirror 17. Rotation of the y-axis mirror 17 causes movement of the laser beam 12 along the y-axis. The numerical control computer 15 controls the output of the power source 16 to control rotation of the y-axis galvanometer 18.

The laser beam 12 is deflected by the y-axis mirror 17 and directed through a focusing lens 19. The lens 19 is adapted to focus the laser beam 12. Preferably, the lens 19 is a multi-element flat-field focusing lens assembly, which optically maintains the focused spot on a flat plane as the laser beam moves across the material to scribe a graphic. The lens 19, mirrors 13, 17 and galvanometers 14, 18 can be housed in a galvanometer block (not shown).

The apparatus 10 further includes a working surface 20 which can be almost any solid substrate such as a table, or even a gaseous fluidized bed. A material 21 is placed on the working surface 20. The material 21 includes a surface 22. The working surface 20 can be adjusted vertically to adjust the distance from the lens 19 to the surface 22 of the material 21. The laser beam 12 is directed by the mirrors 13, 17 against the surface 22 of the material 21. Usually the laser beam 12 is directed generally perpendicular to the surface 22, but different graphics can be achieved by adjusting the angle between the laser beam and the surface from about 45° to about 135°. Movement of the laser beam 12 in contact with the surface 22 of the material 21 causes a graphic 23 to be scribed on the surface 22. The movements and timing of the mirrors 13, 17 are controlled by the numerical control computer 15 to scribe the specific desired graphic 23.

A second computer such as a work station computer (not shown) can be used in the method to facilitate the formation of the desired graphic. For example, a graphic can be scanned into the work station computer, converted into the proper format, and then introduced into the numerical control computer via floppy disk. The numerical control computer then controls the galvanometers and mirrors to form the graphic on the surface of the material at the appropriate EDPUT.

The apparatus 10 can also include a tank 24 to inject a gas such as an inert gas into the working zone. The amount of gas can be controlled by the numerical control computer or by other means. The injection of a gas is discussed in more detail below.

In a series of experiments, graphics were formed on materials using the preferred laser apparatus and method illustrated in FIG. 1. The operating parameters were maintained within the following ranges:

Continuous power: 0.25–25 watts
Area of spot: 0.031–0.071 $mm^2$
Focus distance: 169 mm
Out of focus distance: 127–165 mm, 170–207 mm
Speed: 25–750 mm/sec
Oscillations: 0.5–1.5 mm amplitude
Frequency: 200 Hz–5,000 Hz
Wavelength: 10,600 nm The "continuous power" is the continuous power output of the laser, as distinguished from the power output when the laser has a temporary energy surge, or when the laser is pulsed. The continuous power can be varied by adjusting the power setting on the laser.

The "area of spot" is the area of the spot formed by the laser beam on the surface of the material when the laser beam is stationary relative to the material. The area of the spot formed when the laser beam is in focus is a characteristic of the laser and the lens. It can be determined from the reference materials included with the laser and/or by contacting the manufacturer of the laser. A typical $CO_2$ laser with a typical lens has an area of the spot of 0.0314 $mm^2$, and a typical Nd:YAG laser with a typical lens has an area of the spot of 0.002826 $mm^2$. As shown in FIG. 2, when the focused laser beam contacts the surface 22 of the material 21 it forms a generally circular spot 25 on the surface. The circle has a radius "R". The area of the spot is equal to $3.14 \times R^2$.

The "focus distance" is the distance from the lens to the material when the laser beam is in focus. The "out of focus distance" is a distance from the lens to the material which is greater than or less than the focus distance. It was found that the area of the spot can be increased by defocusing the laser beam both at distances greater than and less than the focus distance. As shown in FIG. 2, when the laser beam is out of focus it forms a generally circular spot 26 on the surface 22 which has a larger area than the spot 25 formed when the laser beam is in focus. For example, when the $CO_2$ laser lens of FIG. 1 is at the focus distance of 169 mm, the area of the spot is 0.031 $mm^2$, and when the laser lens is at an out of focus distance of either 127 mm or 203 mm, the area of the spot is 0.071 $mm^2$. It is understood that the laser beam can also be defocused by other means.

The "speed" is the speed of the laser beam relative to the surface of the material. The speed can be varied by controlling the movements of the x-axis mirror 13 and y-axis mirror 17 illustrated in FIG. 1. In other embodiments of the invention, the speed can be varied by controlling the movements of the laser, the movements of the material, the movements of a lens, by combinations of these methods, or by other means.

"Oscillations" means that the laser beam is oscillated in a specific waveform such as a semicircle or sawtooth while it is scribing the desired graphic. FIG. 3 illustrates a line 27 formed by oscillating the laser beam in a sawtooth pattern while scribing on the material 21. The amplitude "A" of the oscillation is preferably within the range from about 0.1 mm to about 2.5 mm, and more preferably from about 0.5 mm to about 1.5 mm. Using the preferred laser system of FIG. 1, the laser beam can be oscillated by controlling the movements of the x-axis mirror 13 and y-axis mirror 17. Other means can also be used to oscillate the laser beam.

Computer designed experiments followed by Multiple Correlation Analyses were first performed by the use of a special software package called Computer Optimized Process Solutions from Rapid Innovations, Inc., 24803 Detroit Rd., Cleveland, Ohio 44145. The purpose of the statistically designed experiments and multiple correlation analyses was to discover if a key function and the parameters influencing such a function could be identified to overcome the technical barriers which have prevented the use of lasers to scribe graphics on fabric, leather and vinyl materials in the past. Three different computer designed experiments were conducted with a variety of different graphics on different materials at different laser operating conditions. For each experiment, the continuous power, area of spot, speed, and oscillation amplitude were varied according to the experimental design. The area of the spot was varied by changing the distance from the lens to the material as described above. The frequency (5000 Hz) and wavelength (10,600 nm) of the laser were held constant.

The resulting graphics were evaluated and given a rating between 1 and 5, with a 5 rating being considered highest. It should be noted that the rating of a graphic will ultimately depend on the desires of the customer, and the present invention is not limited by any particular rating system. The results of the computer designed experiments are shown below in Tables 1–3.

TABLE 1

EDPUT for First Computerized Designed Experiment

| | | | | | Quality Ratings | | | | | | | | | | |
|---|---|---|---|---|---|---|---|---|---|---|---|---|---|---|---|
| Speed | Oscillation Amplitude | Area of Spot | Power | EDPUT watt-sec/$mm^3$ | Denim Pants | | | Polyester Sheet | | | Cotton Sheet | | | Cotton Bleached Sheet | | |
| | | | | | G1 | G2 | G3 | G1 | G2 | G3 | G1 | G2 | G3 | G1 | G2 | G3 |
| mm/sec | mm | $mm^2$ | watts | $mm^3$ | | | | | | | | | | | | |
| 610 | 0.5 | 0.071 | 2 | 0.046 | 1 | 1 | 1 | 1 | 1 | 1 | 1 | 1 | 1 | 1 | 1 | 1 |
| 610 | 0 | 0.071 | 2 | 0.046 | 1 | 1 | 1 | 1 | 1 | 1 | 1 | 1 | 1 | 1 | 1 | 1 |
| 558 | 0.5 | 0.031 | 2 | 0.116 | 1 | 1 | 2 | 3 | 2 | 4 | 1 | 1 | 1 | 2 | 2 | 5 |
| 178 | 1.2 | 0.071 | 2 | 0.158 | 1 | 1 | 1 | 3 | 3 | 4 | 2 | 1 | 1 | 1 | 1 | 1 |
| 610 | 1.2 | 0.071 | 14 | 0.323 | 1 | 1 | 1 | 2 | 2 | 4 | 2 | 1 | 3 | 3 | 2 | 4 |
| 381 | 1.2 | 0.071 | 14 | 0.518 | 1 | 1 | 1 | 1 | 1 | 1 | 1 | 1 | 1 | 1 | 1 | 1 |
| 54 | 0.5 | 0.071 | 2 | 0.522 | 3 | 1 | 5 | 1 | 1 | 1 | 2 | 4 | 5 | 4 | 1 | 1 |
| 54 | 1.2 | 0.071 | 2 | 0.522 | 1 | 1 | 1 | 2 | 3 | 1 | 4 | 5 | 4 | 2 | 1 | 4 |
| 54 | 0 | 0.071 | 2 | 0.522 | 3 | 4 | 5 | 1 | 1 | 1 | 1 | 1 | 1 | 1 | 1 | 1 |
| 610 | 0 | 0.071 | 25 | 0.577 | 1 | 1 | 1 | 2 | 1 | 3 | 1 | 1 | 2 | 1 | 2 | 2 |
| 610 | 1.2 | 0.071 | 25 | 0.577 | 1 | 1 | 3 | 2 | 4 | 5 | 1 | 2 | 4 | 4 | 3 | 5 |
| 610 | 0.5 | 0.071 | 25 | 0.577 | 1 | 1 | 1 | 1 | 2 | 2 | 1 | 1 | 2 | 2 | 2 | 2 |
| 610 | 0.5 | 0.071 | 25 | 0.577 | 3 | 1 | 3 | 2 | 4 | 4 | 2 | 2 | 3 | 2 | 5 | 5 |
| 610 | 0 | 0.031 | 14 | 0.740 | 2 | 3 | 4 | 2 | 5 | 5 | 2 | 1 | 2 | 4 | 5 | 5 |
| 381 | 0 | 0.071 | 25 | 0.924 | 5 | 5 | 5 | 2 | 2 | 1 | 2 | 5 | 2 | 1 | 5 | 1 |
| 54 | 0.5 | 0.071 | 14 | 3.652 | 5 | 1 | 1 | 1 | 1 | 1 | 1 | 1 | 1 | 1 | 1 | 1 |
| 54 | 0.5 | 0.071 | 25 | 6.521 | 1 | 1 | 1 | 1 | 1 | 1 | 1 | 1 | 1 | 1 | 1 | 1 |
| 54 | 0 | 0.071 | 25 | 6.521 | 1 | 1 | 1 | 1 | 1 | 1 | 1 | 1 | 1 | 1 | 1 | 1 |
| 54 | 0 | 0.071 | 25 | 6.521 | 5 | 5 | 1 | 1 | 1 | 1 | 1 | 1 | 1 | 1 | 1 | 1 |
| 54 | 1.2 | 0.031 | 25 | 14.934 | 1 | 1 | 1 | 1 | 1 | 1 | 1 | 1 | 1 | 1 | 1 | 1 |

G1 = Graphic design consisting of a complex shooting star with many discontinuous lines and filled segments
G2 = Graphic design consisting of a simple array of lines forming a western image
G3 = Graphic design consisting of a circle with tear drop solid filled interior elements

TABLE 2

EDPUT for Second Computerized Designed Experiment

| | | | | | Quality Ratings | | | | | | | | | | |
|---|---|---|---|---|---|---|---|---|---|---|---|---|---|---|---|
| | | | | | Polyester Knit | | | Lyrca Sheet | | | Nylon Sheet | | | Rayon Sheet | | |
| Speed | Oscillation Amplitude | Area of Spot | Power | EDPUT | | | | | | | | | | | | |
| mm/sec | mm | mm² | watts | watt-sec/mm³ | G1 | G2 | G3 | G1 | G2 | G3 | G1 | G2 | G3 | G1 | G2 | G3 |
| 178 | 1.2 | 0.071 | 2 | 0.159 | 2 | 5 | 2 | 1 | 2 | 1 | 1 | 1 | 1 | 1 | 1 | 1 |
| 84 | 0.5 | 0.071 | 2 | 0.337 | 3 | 5 | 2 | 1 | 5 | 5 | 1 | 1 | 1 | 2 | 2 | 1 |
| 84 | 0.5 | 0.071 | 2 | 0.337 | 5 | 5 | 5 | 5 | 5 | 5 | 1 | 1 | 1 | 3 | 2 | 2 |
| 84 | 0 | 0.071 | 2 | 0.337 | 5 | 5 | 5 | 5 | 5 | 5 | 1 | 1 | 1 | 4 | 3 | 3 |
| 84 | 1.2 | 0.071 | 2 | 0.337 | 3 | 3 | 3 | 2 | 2 | 1 | 1 | 1 | 1 | 1 | 1 | 1 |
| 84 | 0 | 0.071 | 2 | 0.337 | 2 | 2 | 1 | 5 | 5 | 5 | 1 | 1 | 1 | 2 | 1 | 1 |
| 381 | 1.2 | 0.071 | 14 | 0.520 | 2 | 5 | 1 | 1 | 2 | 1 | 1 | 2 | 1 | 1 | 1 | 1 |
| 84 | 0.5 | 0.031 | 2 | 0.768 | 5 | 4 | 1 | 5 | 5 | 5 | 1 | 1 | 1 | 2 | 3 | 2 |
| 381 | 0 | 0.031 | 25 | 2.117 | 5 | 2 | 1 | 5 | 5 | 5 | 1 | 1 | 1 | 1 | 1 | 1 |
| 84 | 1.2 | 0.071 | 14 | 2.359 | 1 | 1 | 1 | 4 | 1 | 2 | 1 | 1 | 1 | 1 | 1 | 1 |
| 84 | 0.5 | 0.071 | 14 | 2.359 | 1 | 1 | 1 | 2 | 1 | 1 | 1 | 1 | 1 | 1 | 1 | 1 |
| 84 | 0 | 0.071 | 25 | 4.213 | 1 | 1 | 1 | 1 | 1 | 1 | 1 | 1 | 1 | 1 | 1 | 1 |
| 84 | 0.5 | 0.071 | 25 | 4.213 | 1 | 1 | 1 | 1 | 1 | 1 | 1 | 1 | 1 | 1 | 1 | 1 |
| 84 | 0 | 0.071 | 25 | 4.213 | 1 | 1 | 1 | 1 | 1 | 1 | 1 | 1 | 1 | 1 | 1 | 1 |
| 84 | 1.2 | 0.071 | 25 | 4.213 | 1 | 1 | 1 | 1 | 1 | 1 | 1 | 1 | 1 | 1 | 1 | 1 |
| 84 | 0.5 | 0.071 | 25 | 4.213 | 1 | 1 | 1 | 1 | 1 | 1 | 1 | 1 | 1 | 1 | 1 | 1 |
| 84 | 0 | 0.071 | 25 | 4.213 | 1 | 1 | 1 | 1 | 1 | 1 | 1 | 1 | 1 | 1 | 1 | 1 |
| 84 | 0.5 | 0.071 | 25 | 4.213 | 1 | 1 | 1 | 1 | 1 | 1 | 1 | 1 | 1 | 1 | 1 | 1 |
| 84 | 0 | 0.031 | 14 | 5.376 | 1 | 1 | 1 | 1 | 1 | 1 | 1 | 1 | 1 | 1 | 1 | 1 |
| 84 | 1.2 | 0.031 | 25 | 9.601 | 1 | 1 | 1 | 2 | 1 | 1 | 1 | 1 | 1 | 1 | 1 | 1 |

G1 = Graphic design consisting of a complex shooting star with many discontinous lines and filled segments
G2 = Graphic design consisting of a simple array of lines forming a western image
G3 = Graphic design consisting of a circle with tear drop solid filled interior elements

TABLE 3

Energy Density Per Unit Time for Third Computerized Designed Experiment

| Speed mm/sec | Oscillation Amplitude mm | Area of Spot mm² | Power watts | EDPUT watts-sec/mm | Denim Pants | Lycra Sheet | Leather Swatch | Dark Blue Polyester Sheet | Polyester Knit Sheet | Light Blue Polyester Sheet | Red Polyester Sheet | Nylon Sheet |
|---|---|---|---|---|---|---|---|---|---|---|---|---|
| 610 | 1.5 | 0.071 | 2 | 0.046 | 1 | 1 | 1 | 1 | 1 | 1 | 1 | 1 |
| 610 | 0 | 0.071 | 2 | 0.046 | 1 | 1 | 1 | 1 | 1 | 1 | 1 | 1 |
| 508 | 0 | 0.071 | 2 | 0.056 | 1 | 1.5 | 1 | 1 | 1 | 1 | 1 | 1 |
| 610 | 1 | 0.031 | 2 | 0.104 | 1 | 1 | 1 | 1.25 | 2 | 1 | 1.25 | 2.25 |
| 254 | 0 | 0.071 | 2 | 0.111 | 1 | 3.75 | 1.25 | 1 | 5 | 1.75 | 1.25 | 2.75 |
| 508 | 1.5 | 0.031 | 2 | 0.125 | 1 | 1.5 | 1 | 1 | 1.25 | 1 | 1 | 1.25 |
| 610 | 0.5 | 0.071 | 14 | 0.325 | 1 | 3 | 1 | 1.75 | 3.25 | 2.5 | 3.25 | 1 |
| 76 | 1.5 | 0.071 | 2 | 0.372 | 1 | 4.75 | 1.75 | 1.75 | 2.25 | 3.25 | 3.25 | 1 |
| 76 | 0.5 | 0.071 | 2 | 0.372 | 3.75 | 2.25 | 4.25 | 1 | 1 | 1.25 | 1 | 1 |
| 76 | 1 | 0.071 | 2 | 0.372 | 4.5 | 4.5 | 3.75 | 1.25 | 1 | 1.25 | 1.25 | 1 |
| 76 | 0 | 0.071 | 2 | 0.372 | 4.5 | 3.75 | 5 | 1.5 | 1.5 | 2 | 1.75 | 1 |
| 508 | 1 | 0.071 | 14 | 0.390 | 1.75 | 3 | 1 | 4.75 | 4.25 | 4.25 | 3.25 | 1.5 |
| 610 | 1.5 | 0.071 | 25 | 0.580 | 2 | 3.75 | 1.25 | 1.5 | 3 | 3 | 3.75 | 1 |
| 610 | 0 | 0.071 | 25 | 0.580 | 3.25 | 4 | 3 | 1 | 3 | 2.25 | 3 | 1 |
| 610 | 1.5 | 0.071 | 25 | 0.580 | 2.75 | 3.75 | 1.5 | 1.25 | 1.25 | 1.75 | 2 | 1 |
| 610 | 0 | 0.071 | 25 | 0.580 | 4.25 | 5 | 2.25 | 1 | 1.5 | 1.5 | 2 | 1 |
| 254 | 1.5 | 0.071 | 14 | 0.780 | 3.5 | 4.75 | 2.25 | 1 | 1 | 1.25 | 1.5 | 1 |
| 254 | 0.5 | 0.031 | 25 | 3.135 | 3.75 | 1 | 4.75 | 1 | 1 | 1 | 1.25 | 1 |
| 76 | 1.5 | 0.071 | 25 | 4.656 | 1 | 1 | 1.5 | 1 | 1 | 1 | 1 | 1 |
| 76 | 1.5 | 0.071 | 25 | 4.656 | 1 | 1 | 1.25 | 1 | 1 | 1 | 1 | 1 |
| 76 | 0 | 0.071 | 25 | 4.656 | 1.5 | 1 | 1.5 | 1 | 1 | 1 | 1 | 1 |
| 76 | 0 | 0.031 | 14 | 5.867 | 1 | 1 | 4.25 | 1 | 1 | 1 | 1 | 1 |

In all cases the graphic design scribed on the material was a flower with many filled elements.

It was discovered that there was indeed a unique energy measurement wherein called "EDPUT" which had a critical influence on the desired graphic. Preferably, EDPUT is defined as follows:

$$\text{EDPUT (watts-sec/mm}^3) = \left(\frac{\text{Continuous Power (watts)}}{\text{Area of Spot (mm}^2)}\right)\left(\frac{1}{\text{Speed (mm/sec)}}\right)$$

If the EDPUT was too small, the graphic imparted onto the material would not be readily visible. If the EDPUT was too large, complete carbonization, burnthrough and/or melting of the material would result. There are a number of different ways to achieve the desired EDPUT by adjusting the relative values of the continuous power, area of spot, and speed.

The preferred range of EDPUT varied for each material and for each graphic. Once the preferred range of EDPUT for a given material and a given graphic were defined, the EDPUT could be controlled to stay within that range to achieve desired results in a repeatable fashion. From the results of the computer designed experiments, a highly preferred range of EDPUT for a variety of different fabric, leather and vinyl materials is from about 0.11 to about 6.52 watts-sec/mm$^3$. From the results of different experiments with other materials as shown below in Table 4, a preferred range of EDPUT for a variety of different fabric, leather and vinyl materials is from about 0.04 to about 15.81 watts-sec/mm$^3$. It is recognized that the specific preferred EDPUT will often vary depending on the particular type, color and thickness of material, the particular type and size of graphic, as well as other factors.

TABLE 5

EDPUT Computations for Typical $CO_2$ Laser

| Power (watts) | Spot Diameter (mm) | Area of Spot (mm$^2$) | Energy Density (watts/mm$^2$) | Speed (mm/sec) | EDPUT (watts-sec/mm$^3$) |
|---|---|---|---|---|---|
| 2 | 0.2 | 0.0314 | 63.694 | 762 | 0.084 |
| 2 | 0.2 | 0.0314 | 63.694 | 76 | 0.838 |
| 2 | 0.3 | 0.07065 | 28.309 | 762 | 0.037 |
| 2 | 0.3 | 0.07065 | 28.309 | 76 | 0.372 |
| 25 | 0.2 | 0.0314 | 796.178 | 762 | 1.045 |
| 25 | 0.2 | 0.0314 | 796.178 | 76 | 10.476 |
| 25 | 0.3 | 0.07065 | 353.857 | 762 | 0.464 |
| 25 | 0.3 | 0.07065 | 353.857 | 76 | 4.656 |
| 100 | 0.2 | 0.0314 | 3,184.713 | 762 | 4.179 |
| 100 | 0.2 | 0.0314 | 3,184.713 | 76 | 41.904 |
| 100 | 0.3 | 0.07065 | 1,415.428 | 762 | 1.858 |
| 100 | 0.3 | 0.07065 | 1,415.428 | 76 | 18.624 |
| 200 | 0.2 | 0.0314 | 6,369.427 | 762 | 8.359 |
| 200 | 0.2 | 0.0314 | 6,369.427 | 76 | 83.808 |
| 200 | 0.3 | 0.07065 | 2,830.856 | 762 | 3.715 |
| 200 | 0.3 | 0.07065 | 2,830.856 | 76 | 37.248 |

TABLE 4

Preferred Ranges of Laser Operating Parameters and EDPUT for a Variety of Materials Tested

| Fabric | Power Min | Power Max | Speed Min | Speed Max | Area of Spot Min | Area of Spot Max | Amplitude Min | Amplitude Max | EDPUT Min | EDPUT Max |
|---|---|---|---|---|---|---|---|---|---|---|
| Tan Organza Sheet | 2 | 10 | 381 | 650 | 0.031 | 0.031 | 0.50 | 1 | 0.099256 | 0.846668 |
| Light Blue Polyester Sheet | 2 | 14 | 254 | 635 | 0.031 | 0.07 | 0.00 | 1 | 0.044994 | 1.778004 |
| Black Lycra Sheet | 2 | 25 | 76 | 610 | 0.031 | 0.07 | 0.00 | 1.5 | 0.046838 | 10.61121 |
| Denim Jeans | 2 | 25 | 51 | 650 | 0.031 | 0.07 | 0.00 | 1.5 | 0.043956 | 15.81278 |
| Brown Leather Jacket | 2 | 25 | 76 | 350 | 0.031 | 0.07 | 0.00 | 0.5 | 0.081633 | 10.61121 |
| Dark Blue Polyester Sheet | 10 | 14 | 200 | 508 | 0.07 | 0.07 | 0.00 | 1 | 0.281215 | 1 |
| Green Knit Polyester Sheet | 2 | 25 | 83 | 382 | 0.031 | 0.07 | 0.00 | 1.2 | 0.074794 | 9.716284 |
| Red Polyester Sheet | 10 | 14 | 250 | 508 | 0.031 | 0.07 | 0.00 | 1 | 0.281215 | 1.806452 |
| Nylon Jacket | 2 | 10 | 650 | 250 | 0.031 | 0.07 | 0.00 | 0 | 0.114286 | 0.496278 |
| Acetate Jacket Lining | 2 | 10 | 650 | 250 | 0.031 | 0.07 | 0.00 | 0 | 0.114286 | 0.498278 |
| Dark Brown Leather Swatch | 10 | 25 | 125 | 350 | 0.031 | 0.07 | 0.00 | 0 | 0.408163 | 6.451613 |
| Brown Urethane Swatch | 5 | 15 | 125 | 500 | 0.07 | 0.07 | 0.00 | 0 | 0.142857 | 1.714286 |
| Black Leather Swatch | 10 | 15 | 100 | 350 | 0.031 | 0.07 | 0.00 | 0 | 0.408163 | 4.83871 |
| Green Polyester Sheet | 2 | 25 | 178 | 610 | 0.031 | 0.07 | 0.00 | 1.2 | 0.046838 | 4.530627 |
| Red Cotton Sheet | 2 | 25 | 76 | 610 | 0.031 | 0.07 | 0.00 | 1.2 | 0.046838 | 10.61121 |
| Bleached and Undyed | | | | | | | | | | |
| Cotton Sheet | 2 | 25 | 76 | 610 | 0.031 | 0.07 | 0.00 | 1.2 | 0.046838 | 10.61121 |
| Unbleached and Undyed | | | | | | | | | | |
| Cotton Sheet | 2 | 25 | 76 | 610 | 0.031 | 0.07 | 0.00 | 1.2 | 0.046838 | 10.61121 |
| Nylon Reinforced Rubber | 5 | 25 | 76 | 508 | 0.031 | 0.07 | 0.00 | 1.2 | 0.140607 | 10.61121 |
| Cotton Blend Velour | 2 | 25 | 76 | 610 | 0.031 | 0.07 | 0.00 | 1.2 | 0.046838 | 10.61121 |
| Cotton Cordoroy Sheet | 2 | 25 | 76 | 610 | 0.031 | 0.07 | 0.00 | 1.2 | 0.046838 | 10.61121 |

It now becomes clear why laser scribing of graphics on fabric, leather and vinyl materials has not previously been commercialized: the preferred range of EDPUT is often narrow and only a fraction of the EDPUT capability of the laser. For example, the possible range of EDPUT for typical lasers is from about 0.006 to about 931 watts-sec/mm$^3$ as shown below in Tables 5 and 6. Hence, to identify and use a specific preferred EDPUT range from about 0.11 to about 6.52 watts-sec/mm$^3$ is similar to locating a needle in a haystack.

TABLE 6

EDPUT Computations for Typical Nd:YAG Laser

| Power (watts) | Spot Diameter (mm) | Area of Spot (mm$^2$) | Energy Density (watts/mm$^2$) | Speed (mm/sec) | EDPUT (watts-sec/mm$^3$) |
|---|---|---|---|---|---|
| 2 | 0.06 | 0.002826 | 707.714 | 5004 | 0.141 |
| 2 | 0.06 | 0.002826 | 707.714 | 76 | 9.312 |
| 2 | 0.3 | 0.07065 | 28.309 | 5004 | 0.006 |
| 2 | 0.3 | 0.07065 | 28.309 | 76 | 0.372 |
| 25 | 0.06 | 0.002826 | 8,846.426 | 5004 | 1.768 |
| 25 | 0.06 | 0.002826 | 8,846.426 | 76 | 116.400 |
| 25 | 0.3 | 0.07065 | 353.857 | 5004 | 0.071 |

TABLE 6-continued

EDPUT Computations for Typical Nd:YAG Laser

| Power (watts) | Spot Diameter (mm) | Area of Spot (mm$^2$) | Energy Density (watts/mm$^2$) | Speed (mm/sec) | EDPUT (watts-sec/mm$^3$) |
|---|---|---|---|---|---|
| 25 | 0.3 | 0.07065 | 353.857 | 76 | 4.656 |
| 100 | 0.06 | 0.002826 | 35,385.704 | 5004 | 7.071 |
| 100 | 0.06 | 0.002826 | 35,385.704 | 76 | 465.601 |
| 100 | 0.3 | 0.07065 | 1,415.428 | 5004 | 0.283 |
| 100 | 0.3 | 0.07065 | 1,415.428 | 76 | 18.624 |
| 200 | 0.06 | 0.002826 | 70,771.408 | 5004 | 14.143 |
| 200 | 0.06 | 0.002826 | 70,771.408 | 76 | 931.203 |
| 200 | 0.3 | 0.07065 | 2,830.856 | 5004 | 0.566 |
| 200 | 0.3 | 0.07065 | 2,830.856 | 76 | 37.248 |

Figure 5:
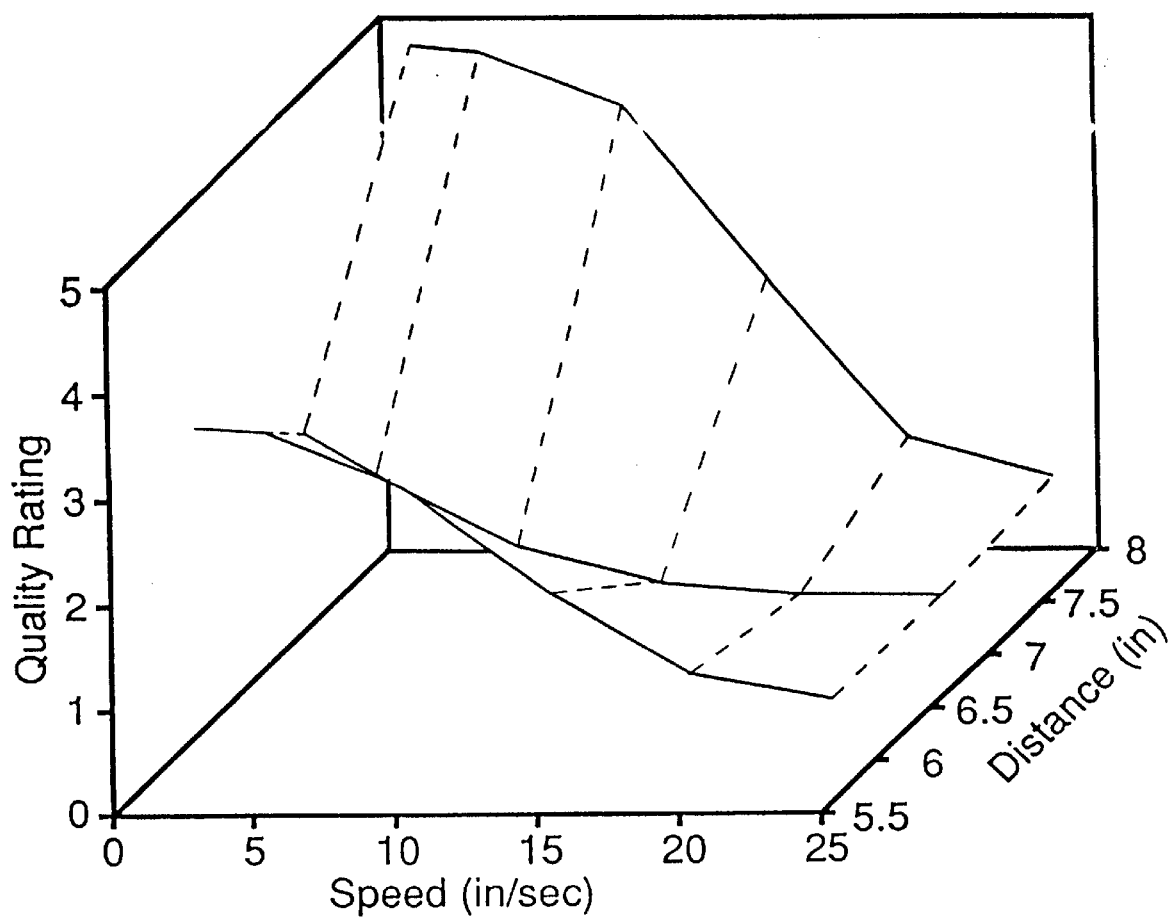
Figure 6:
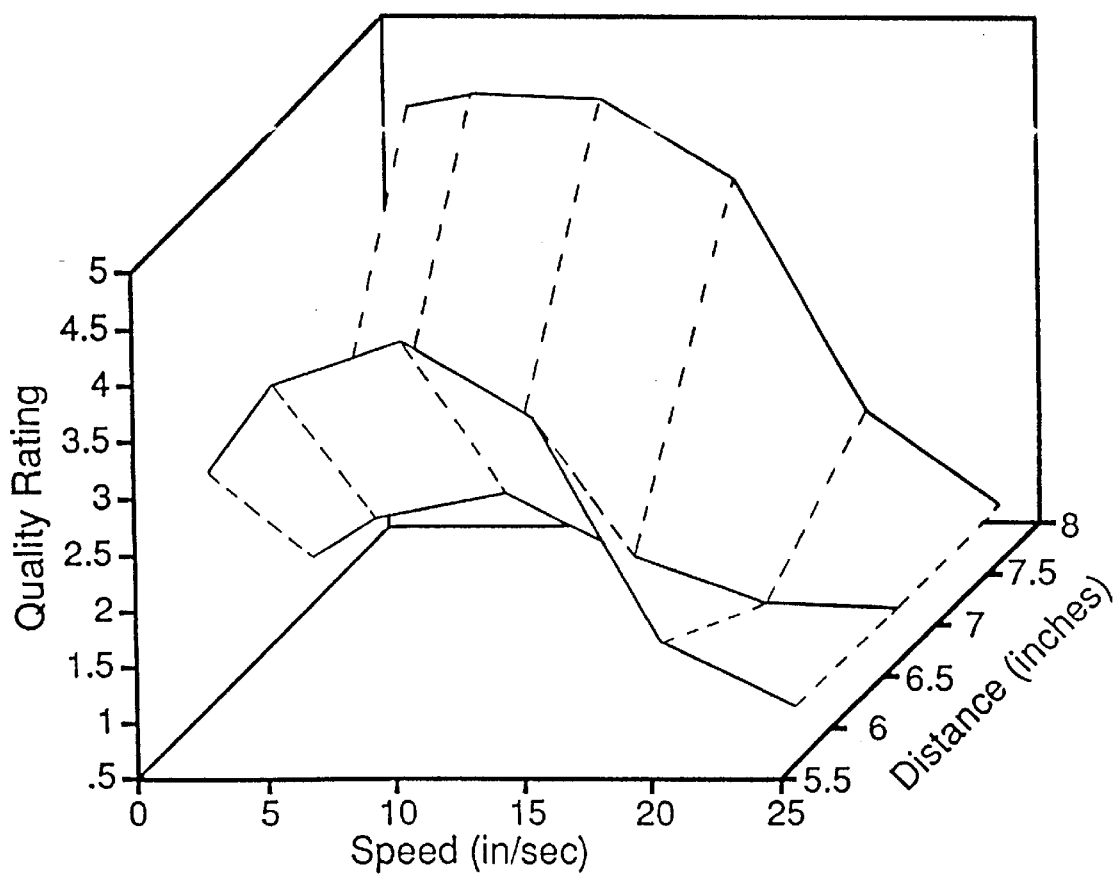

In some cases, the results can be affected by the introduction of the oscillation amplitude variable. As described above, the laser beam can be oscillated along a waveform such as a sawtooth or semicircle while scribing. FIGS. 4–6 show that for the experiments where a solid graphic was scribed on denim and the quality of the graphic was evaluated after washing, oscillation amplitude and distance from the lens to the denim (affecting the area of the spot) were important. All the experiments were conducted at a continuous power of 14 watts. The experiments shown in FIG. 4 were conducted with no oscillation of the laser beam. FIG. 4 illustrates that there is almost no possible combination of settings at a power level of 14 watts with no oscillation of the laser beam that produces a rating higher than 4. A rating of about 4 can only be achieved at an out of focus distance of about 7.6 inches (193 mm) and a narrow operating speed of about 5 inches/second (127 mm/second). The experiments shown in FIG. 5 were conducted with the laser beam oscillated at an amplitude of 0.02 inch (0.5 mm). FIG. 5 illustrates that the use of an oscillation of 0.02 inch (0.5 mm) broadens the operating range to produce a higher rated product. In this case, higher ratings are achieved at distances which are out of focus. The experiments shown in FIG. 6 were conducted with the laser beam oscillated at an amplitude of 0.04 inch (1.0 mm). FIG. 6 further demonstrates the positive effects of oscillation and out of focus distance on product rating. These results are in contrast with the previous teachings of the use of focused laser radiation without oscillation. Of course, desired results can be obtained with focused laser radiation and control of the EDPUT.

In yet another series of experiments, different types of graphics were scribed onto a variety of fabric, leather and vinyl materials. While the different graphics are illustrated in relation to particular materials such as denim, it is recognized that the laser method of this invention is capable of scribing the graphics on many other different types of materials. Table 7 below outlines the combination and ranges of operating parameters that together generated a preferred level of EDPUT to provide the desired graphics on the materials without complete carbonization, burnthrough and/or melting.

TABLE 7

Operating Parameters and Resulting EDPUT which Produced New Design Effects

| Design Effect | Power (watts) | Speed (mm/sec) | Oscillation (mm) | Distance (mm) | EDPUT (watts-sec/mm$^3$) |
|---|---|---|---|---|---|
| Denim: | | | | | |
| Graphic Images | 2–25 | 86–762 | 0–1.5 | 127–203 | 0.037–9.37 |
| Sandblasted Look | 5–25 | 100–762 | 0–1.2 | 169–203 | 0.092–8.065 |
| Stonewashed Look | 7–20 | 100–635 | 0–1.0 | 169–203 | 0.155–6.45 |
| Frayed Look | 12–25 | 100–635 | 0–1.0 | 169–203 | 0.266–8.065 |
| Logos, Identification | 2–25 | 86–762 | 0–1.5 | 169–203 | 0.037–9.37 |
| Stitched Look | 12–25 | 100–350 | 0–1.5 | 169–203 | 0.483–8.065 |
| Plaid Look | 5–25 | 86–762 | 0–1.0 | 169–203 | 0.092–9.37 |
| Polka Dot Look | 5–25 | 100–762 | 0–1.0 | 169–203 | 0.092–8.065 |
| Moire Look* | 10–25 | 100–600 | 0–1.5 | 169–203 | 0.235–8.065 |
| Crazy Lines Look | 5–25 | 120–762 | 0–1.5 | 169–203 | 0.092–9.37 |
| Leather & Vinyl: | | | | | |
| Graphic Images | 10–25 | 86–300 | 0–1.5 | 169–203 | 0.469–9.37 |
| Tufted Look | 20–25 | 86–250 | 0–1.0 | 169–203 | 1.127–4.094 |
| Hand Sewn Look | 10–25 | 86–350 | 0–1.5 | 127 | 0.402–4.094 |
| Logos, Identification | 7–25 | 86–460 | 0–1.5 | 169–203 | 0.214–9.377 |

*The frequency was changed continuously as the design pattern was scribed.

TABLE 7

Operating Parameters and Resulting EDPUT which Produced New Design Effects

| Design Effect | Power (watts) | Speed (mm/sec) | Oscillation (mm) | Distance (mm) | EDPUT (watts-sec/mm³) |
|---|---|---|---|---|---|
| Organza, Nylon, Rayon, Acetate, etc.: | | | | | |
| Graphic Images | 7–25 | 200–762 | 0–1.5 | 169–203 | 0.129–4.032 |
| Polyester and Polyester Blends: | | | | | |
| Relief Look | 15–25 | 150–762 | 0–1.0 | 169–203 | 0.277–5.37 |
| Metalized Look | 20–25 | 200–762 | 0–1.0 | 169 | 0.847–4.032 |
| Bleached & Unbleached Blends of Cotton/Polyester | 10–25 | 100–635 | 0–1.5 | 127–203 | 0.222–8.064 |
| Graphics on Lycra | 20–25 | 250–635 | 0–1.5 | 169–203 | 0.444–3.225 |
| Graphics on Polyester Knit | 12–25 | 100–762 | 0–0.5 | 169–203 | 0.222–8.064 |
| Graphics on Polyester Sheet | 10–25 | 200–762 | 0–1.5 | 169–203 | 0.185–4.032 |
| Graphics on Blends of Cotton & Cotton/Polyester | 5–25 | 86–762 | 0–1.5 | 127–203 | 0.092–9.378 |
| Nylon Open Cut | 10–25 | 86–635 | 0 | 169 | 0.508–9.377 |

EXAMPLE I

Denim

A. Graphic Images

Figure 7:
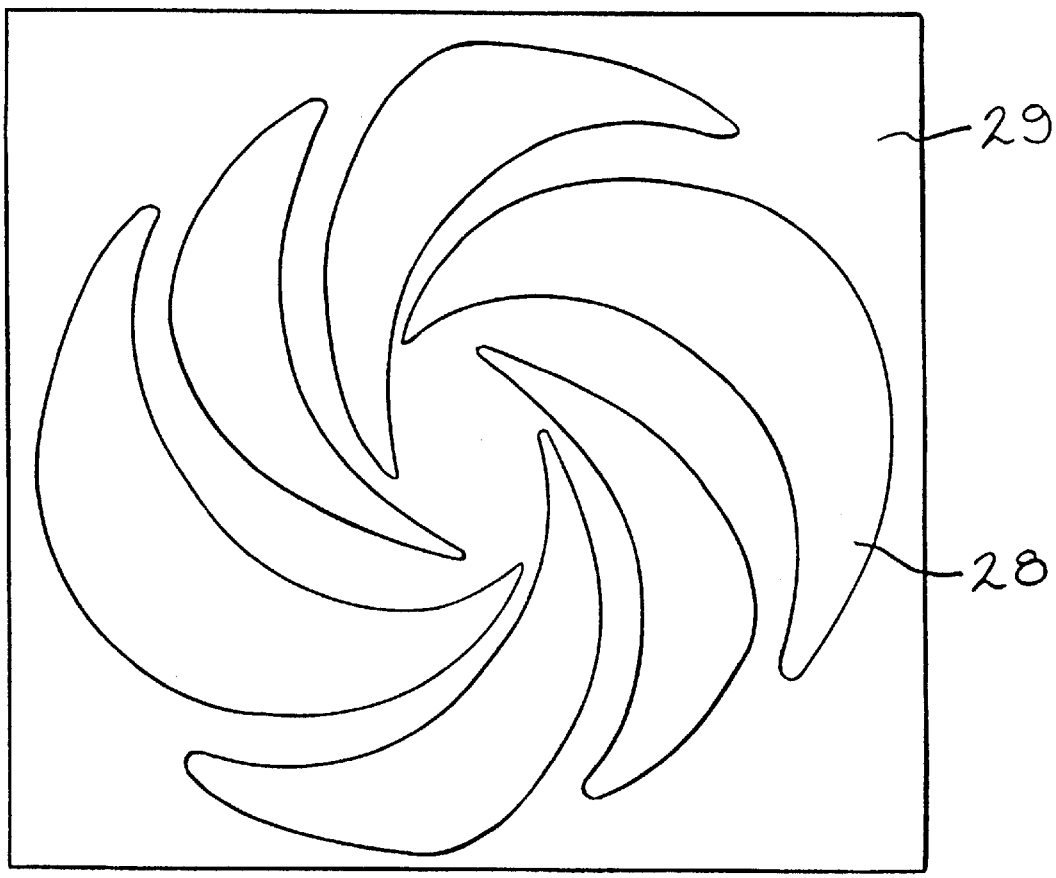
FIGS. 7–8 and 11–30 are drawings and photographs of various graphics formed on materials according to this invention.

Rarely does one find graphic images on denim shirts, jackets or jeans since the technology to produce such designs is inherently difficult and/or expensive. For example, graphic images could be stitched or embroidered onto the denim fabric in a very expensive or labor intensive process. Such techniques could only produce limited graphic images and are seldom seen on denim. However, by the laser method of this invention, numerous graphic images were scribed onto denim jeans, shirts, jackets, vests, and shorts. The quality of the denim varied considerably, yet the laser method worked superbly on all denims. By "graphic image" is meant any graphic that is scribed without complete carbonization, melting and/or burnthrough of the material, including designs, looks, drawings, pictures, logos, identification and other graphics. Particular types of graphic images are described in more detail below. FIG. 7 illustrates an example of a graphic image 28 formed on denim 29 according to this invention. The area of the graphic image 28 is a faded indigo/white color, while the denim 29 is the conventional indigo color of denim. Graphic images ranged from random lines to complicated sketches of animals and computer generated graphic images. In order to repeat the graphic image on the denim fabric, one graphic image was scribed onto the denim and the fabric was simply moved on the working surface and the graphic image again scribed onto the denim. Graphic images were scribed onto the front and back pockets and continuously around all parts of the legs and sleeves of jeans and shirts. It was discovered that the graphic image produced on the denim may at first appear visible and without holes, but after washing the graphic image may either disappear or contain holes and penetrations. In order to avoid the formation of holes and penetrations, computer designed experiments were conducted and the quality of the graphic image was rated before and after washing. Selection of the laser operating parameters and settings which produced the desired graphic images after washing was then used to specify the preferred EDPUT. The combination and ranges of operating parameters, and the resulting EDPUT range that produced a variety of preferred graphic images on denim, are given in Table 7.

B. Sandblasted Look

Denim jeans are often sold with a worn look in the upper knee portions and back seat portion. The effect is similar to a feathered or shadowed look in which the degree of wormness is continuously changed along the length and width of the look. To achieve this effect, the jeans are typically sandblasted in a labor intensive manufacturing process whereby each pair of jeans is individually sandblasted in a controlled environment facility. It is estimated that the manufacturing cost for sandblasting is over $2.00 per pair of jeans. However, the laser method of this invention is relatively inexpensive both from a capital cost and an operating cost, consisting of only one step (laser scribing). The method is also free from environmental problems. It was discovered during the experiments that the laser could be utilized to simulate the sandblasted look on denim. The laser method can also form the sandblasted look on khaki and other materials.

Figure 8:
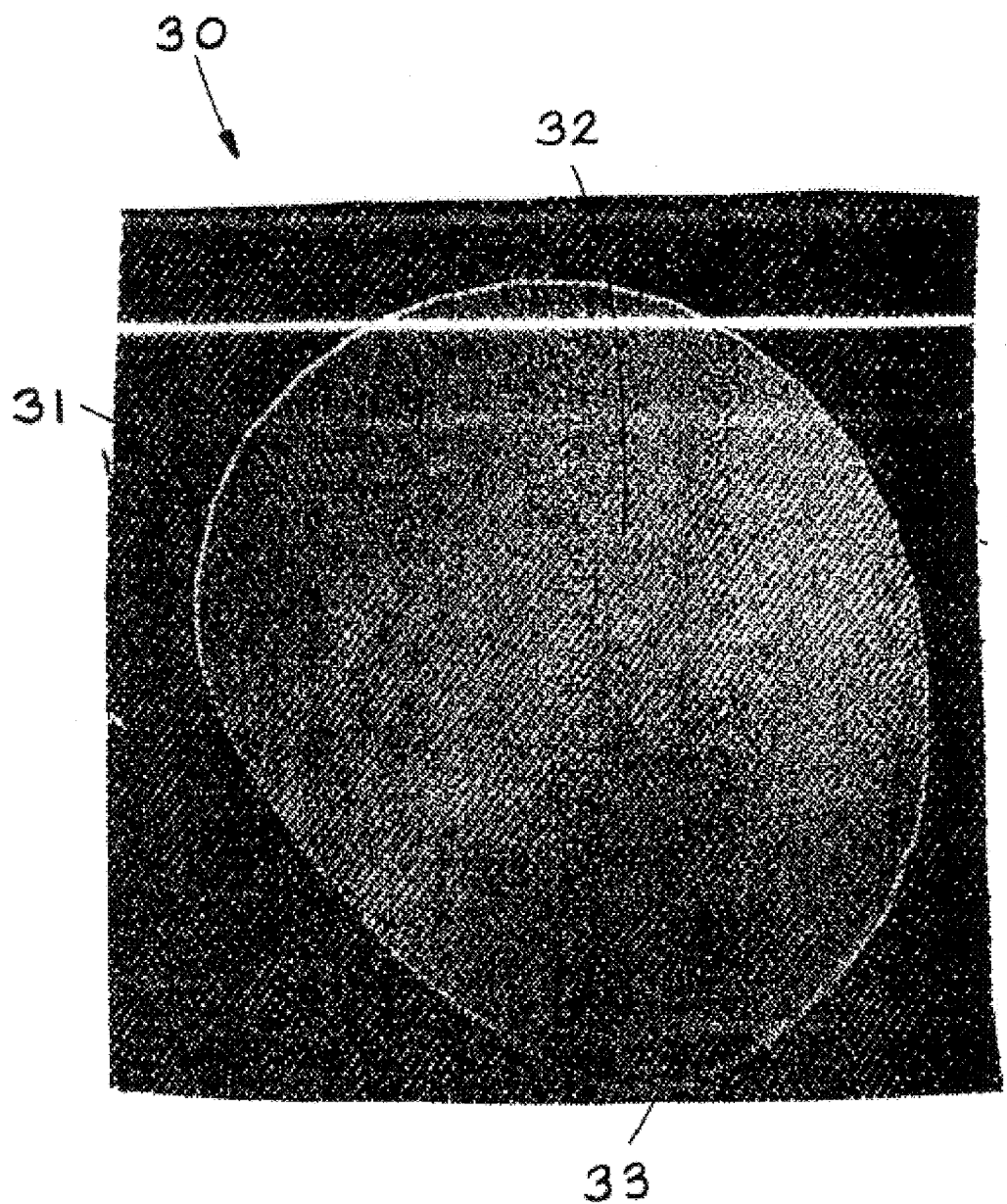

FIG. 8 is a photograph of a sandblasted look 30 formed on denim 31 according to this invention. The sandblasted look 30 was created by draping the denim 31 over a cone and scribing a solid pattern as will be described below. The illustrated sandblasted look 30 includes a central area 32 which appears to be most worn because of its lighter color (a faded indigo/white color). The sandblasted look 30 also includes a peripheral area 33 which appears to be least worn because of its darker color (an indigo color only slightly faded). The degree of wormness changes continuously along the length and width of the sandblasted look 30. The change in the degree of wormness can be characterized as follows. A pure indigo color characteristic of unworn denim is assigned a value of 100% and a pure white color is assigned a value of 0%. The most worn area 32 of the sandblasted look 30 preferably has a value from about 0% to about 30%, and more preferably from about 5% to about 20%. The least worn area 33 of the sandblasted look 30 preferably has a value from about 70% to about 99%, and most preferably from about 80% to about 95%.

Figure 9:
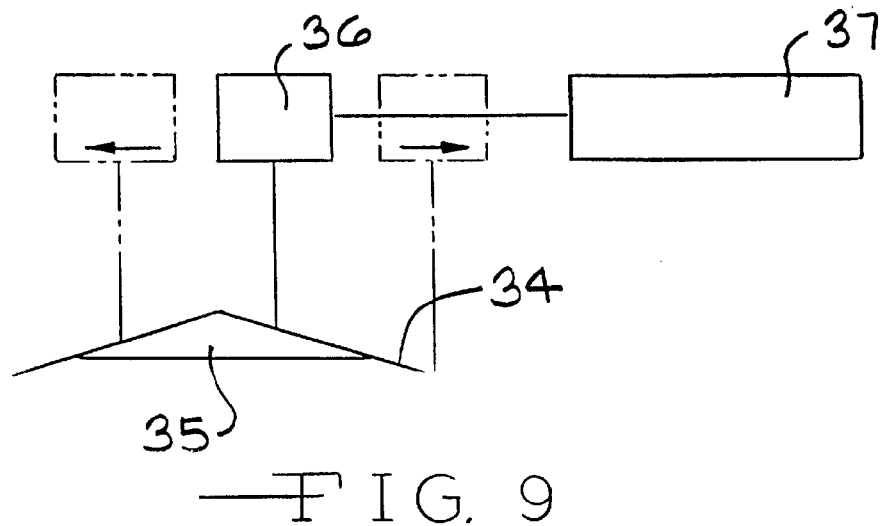
FIG. 9 is a schematic view of a method of forming the sandblasted look by continuously changing the distance from the lens to the denim via the use of a cone.

The sandblasted look can be created by utilizing new techniques to control the distance from the laser lens to the denim (and thus the EDPUT), via the use of a form such as a cone, cup or wedge to form the denim. The denim is draped over the form. The laser then sweeps over the form to scribe a solid pattern on the denim such as a filled-in circle, rectangle or square, or a pattern of closely spaced lines. This unique technique has the effect of continuously changing the distance from the lens to the denim as the laser beam scribes the solid pattern on the denim. When the distance from the lens to the denim is at the focus distance, the EDPUT is highest and the laser beam removes the most dye from the denim to create a most worn (lightest) look. When the distance from the lens to the denim is at the most out of focus distance (either less than or greater than the focus distance), the EDPUT is lowest and the laser beam removes the least dye from the denim to create a least worn (darkest) look. FIG. 9 illustrates a method in which a sample of denim 34 is draped over a cone 35. A mirror system and lens 36 controlled by a computer 37 sweeps over the denim 34. The continuously changing distance from the lens 36 to the denim 34 forms a sandblasted look of course, this can alternately be achieved by programming the laser system computer to continuously change the distance during scribing.

Figure 10:
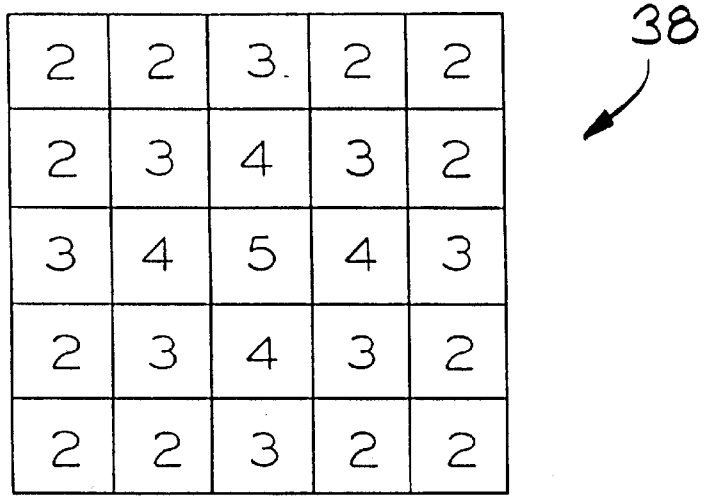
FIG. 10 is a drawing of a grid for changing the relative EDPUT of the laser method to form the sandblasted look.

It was also learned that the sandblasted look could be simulated by scribing solid patterns onto a grid such as the grid 38 shown in FIG. 10. In this case, the EDPUT changes along each axis of the grid 38 to insure a sandblasted look. In the drawing, the number 5 indicates a relative value for the highest EDPUT and the number 2 indicates a relative value for the lowest EDPUT.

Figure 11:
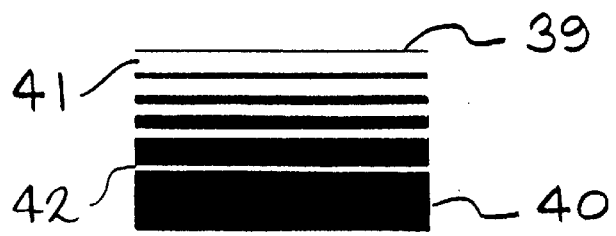

Finally, it was also discovered that the sandblasted look could be created by utilizing a design such as shown in FIG. 11. The design is composed of ever increasing or decreasing line spacing and thickness. In FIG. 11, the line thickness increases from a thin line 39 to a thick line 40. The spacing between the lines decreases from a wide space 41 to a narrow space 42. Preferably, the thin line 39 and narrow space 42 have a width from about 0.05 mm to about 0.5 mm, and more preferably about 0.1 mm. Preferably, the thick line 40 and wide space 41 have a width from about 2.0 mm to about 4.0 mm, and most preferably about 3.0 mm.

Alternatively, a graphic image such as a radial gradient could be used which gradually changes the shade of the background from dark in the center to light along the edges. Normally the laser numerical control computer program could not process this image because it is a greyscale image and only black and white images can be successfully converted by the laser numerical control computer program. However, it was discovered that if this image was first processed by a graphic editing program such as Adobe Photoshop or the shareware program GVPD or other such programs and converted to a black and white image by the halftone screen, pattern dither, threshold, diffusion dither, or preferably the error diffusion method, then the laser numerical control system can in fact process and scribe the image. This leads to surprising results: the scribed image assumes the appearance of a greyscale image with different shades of the base color versus the typical black and white contrast. Therefore, this new technique can be used to simulate a faded pattern or sandblasted look. Further, as described later, this new technique can be used to create very exciting greyscale type graphic images on materials which in the past were simply impossible.

The combination and ranges of operating parameters, and the resulting EDPUT range that produced the sandblasted look using these techniques on denim, are given in Table 7.

C. Stonewashed Look

Figure 12:
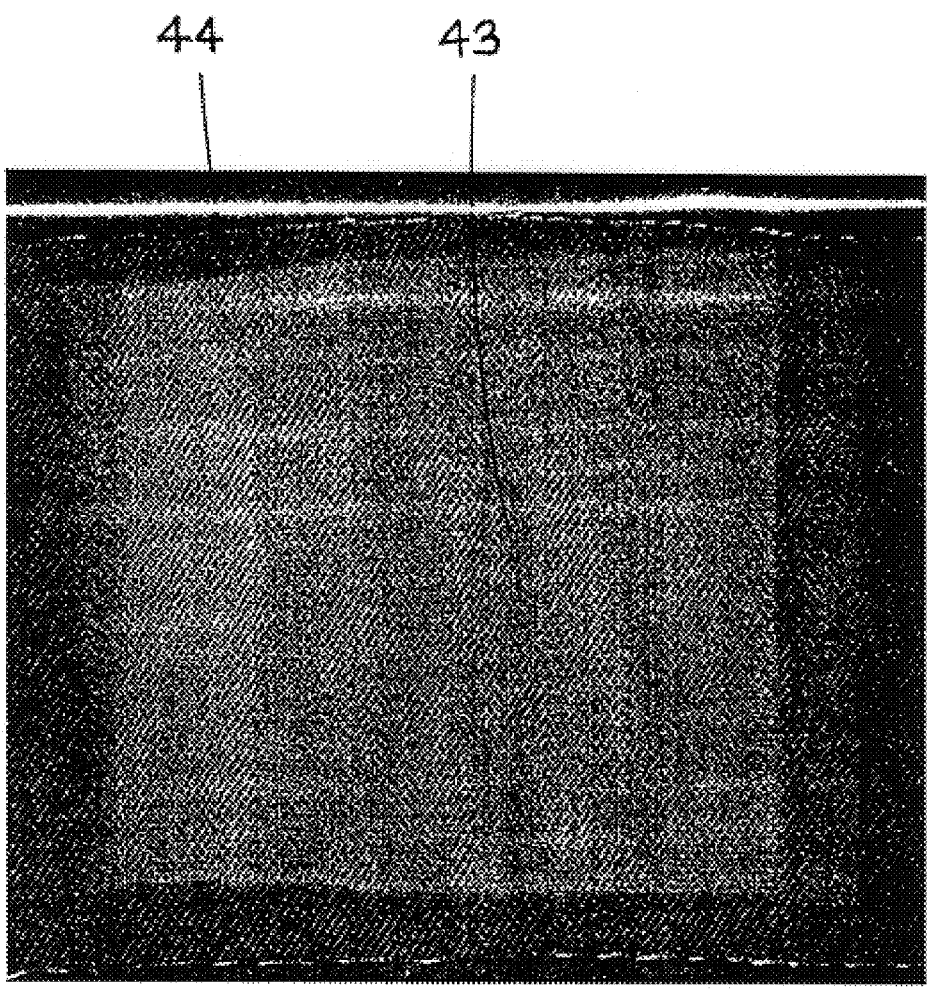

A particularly novel concept invented during the experiments was the manner by which the laser induced design could be set up to create a stonewashed look on denim. The method can also be used to create a stonewashed look on khaki and other materials. With a stonewashed look on denim jeans, the entire jeans are a faded color. The conventional method used to create such a look is very expensive, consists of some four separate steps including sandblasting and enzyme washing, and is plagued with environmental problems. Conversely, the laser method is relatively inexpensive both from a capital cost and an operating cost, consisting of only two steps (laser scribing and simple washing) and is free from environmental problems. The specific technique used to create this novel look was to first scribe contiguous solid patterns such as filled-in circles, rectangles or squares, or patterns of closely spaced lines, over the entire piece of denim. Alternately, a single pattern instead of contiguous patterns could cover the entire piece. An out of focus distance from the lens to the denim is used to spread the energy across a wider area. The EDPUT of the laser is carefully controlled to prevent burnthrough. This method produced a surprising effect: the look of stonewashed fabric when the denim was first washed. FIG. 12 is a photograph of the stonewashed look 43 formed on denim 44 according to this invention. It can be seen that the entire stonewashed look 43 is a faded indigo/white color. To characterize the color, if the pure indigo color of unworn denim is assigned a value of 100% and a pure white color is assigned a value of 0%, the color of the stonewashed look 43 is preferably from about 5% to about 40%, and more preferably from about 5% to about 25%. The combination and ranges of operating parameters, and resulting EDPUT range that produced the stonewashed look, are given in Table 7.

D. Frayed Look

Figure 13:
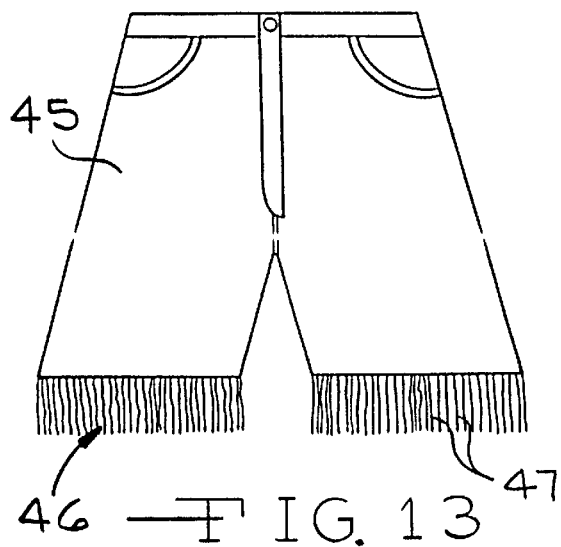
Figure 14:
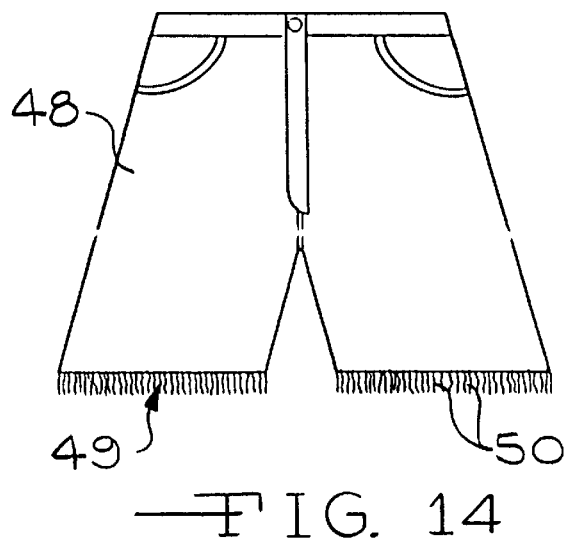

Another novel concept invented during the experiments was the incorporation of a specific pattern onto the denim which assumed the appearance of a frayed look. FIG. 13 illustrates an example of a frayed look formed on denim shorts 45 by the method of this invention. The shorts 45 have a white fray 46 at the ends of the legs. The fray 46 consists of parallel strands 47 that are relatively long and somewhat spaced apart. FIG. 14 illustrates an example of another type of frayed look known as a threadbare look on denim shorts 48. The shorts have an indigo fray 49 at the ends of the legs. The fray 49 consists of parallel strands 50 that are relatively shorter and closer together than the strands 47 of the fray 46. These effects could be accomplished such that the design looked quite solid after scribing and then only became frayed after washing. Alternately the design effect could be achieved directly as a result of the laser scribing. To create the frayed look, it was learned that first the same EDPUT range used to create the stonewashed look should be used. Second, in the specific areas where the fibers are to be frayed, the process is repeated three or four times. Varying degrees of fraying can be achieved by control of the EDPUT and the number of times the laser duplicates the pattern in the same area. The balance of these parameters can be chosen such that the denim is burned through following the laser scribing or the frayed look is achieved only after washing wherein some of the fibers are destroyed. The combination and ranges of operating parameters, and the resulting EDPUT range that produced the frayed look, are given in Table 7. A frayed look can also be produced by the use of closely spaced lines, intersecting lines or duplicate lines such that partial or complete carbonization and partial or complete burnthrough is intended.

E. Logos and Identification

Figure 15:
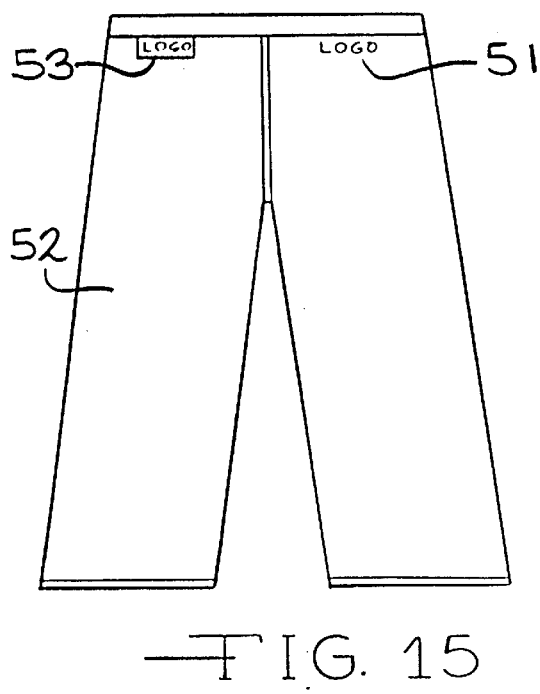

It was learned that various logos and other identification could be scanned into the computer system and scribed onto denim and other materials in a very high quality fashion. This method can create a whole new application for eliminating the costly tags and logos on denims and other materials. FIG. 15 illustrates an example of a logo 51 formed on denim jeans 52 according to this invention. The laser scribed logo 51 replaces the original logo tag 53 conventionally sewn onto jeans. This application would provide cost savings to the manufacturer and improved comfort to the customer since the tags sewn onto the garments such as shirts, blouses and jackets could actually be totally eliminated. The EDPUT is controlled such that the logo or other identification can be scribed and the quality of the design can be maintained through repeated washings. The laser method was particularly useful for scribing alphanumeric characters for identification onto a variety of materials, due to the registration and precision qualities controlled by the numerical control system which governs the movement of the x-y mirrors and therefore the location and spacing of the characters scribed on the material. The combination and ranges of operating parameters, and the resulting EDPUT range that produced logos and identification, are given in Table 7.

F. Stitched Look

Figure 16:
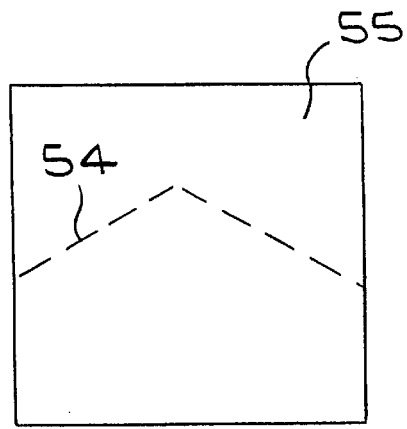

The laser scribing method can provide a stitched look that is often included on the back pockets of denim jeans. This look is created by pulsing the laser beam during scribing of the stitched design. The laser beam can be pulsed by reducing the frequency of the laser beam from the usual frequency of 5,000 Hz to a frequency within the range from about 200 Hz to about 2000 Hz. FIG. 16 illustrates an example of the stitched design 54 formed on denim jeans 55 according to this invention. The stitched design 54 consists of a discontinuous line similar to a series of dashes. The combination and ranges of operating parameters, and the resulting EDPUT range that produced the stitched look, are given in Table 7. The stitched look could also be created by a specific stitched design that is scanned into the computer system for numerical control of the laser beam, or by use of a stencil or template.

G. Plaid Look

Figure 17:
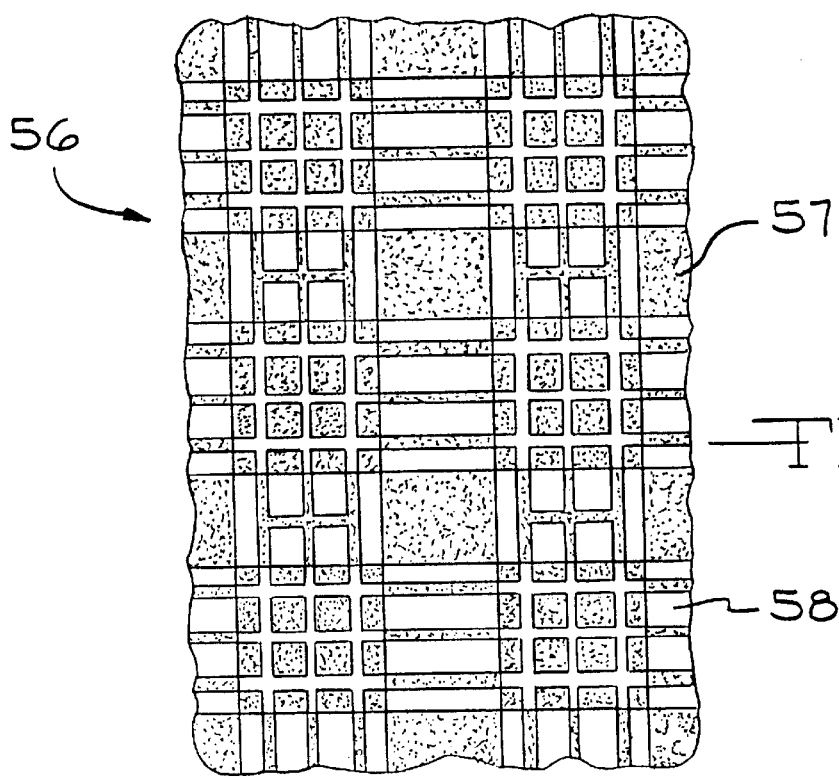

FIG. 17 illustrates an example of a plaid design 56 formed on denim according to this invention. The design includes alternating darker areas 57 which are the conventional indigo color of denim, and lighter areas 58 which are a faded indigo/white color. The plaid look is formed by the laser tracing the path of a scanned plaid pattern consisting of solid or filled-in and outline areas that was converted to a specific vector image. The combination and ranges of operating parameters, and the resulting EDPUT range that produced the plaid look, are shown in Table 7.

H. Polka Dot Look

Figure 18:
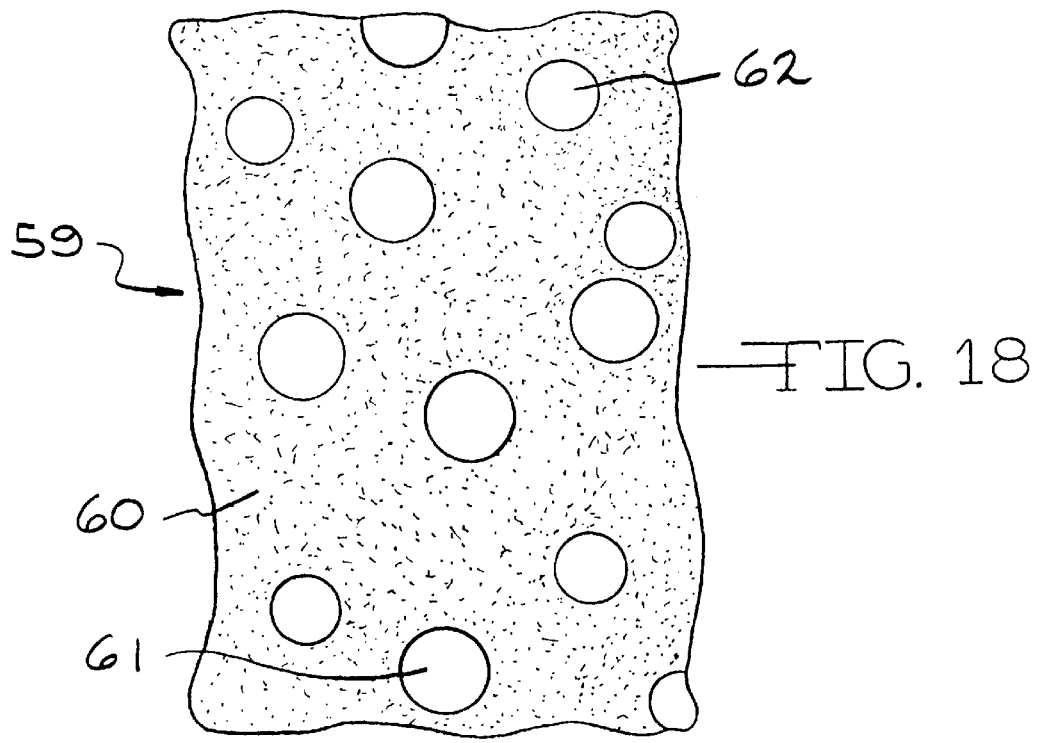

FIG. 18 illustrates an example of a polka dot design 59 formed on denim according to this invention. The design includes a background area 60 which is the conventional indigo color of denim. A plurality of relatively large circular areas 61 and relatively small circular areas 62 are spaced relatively randomly on the background area 60. The circular areas 61, 62 are a faded indigo/white color. The polka dot look is formed by the laser tracing the path of a scanned image pattern consisting of solid or filled-in and outline areas that was converted to a specific vector image. The combination and ranges of operating parameters, and the resulting EDPUT range that produced the polka dot look, are given in Table 7.

I. Moire Look

Figure 19:
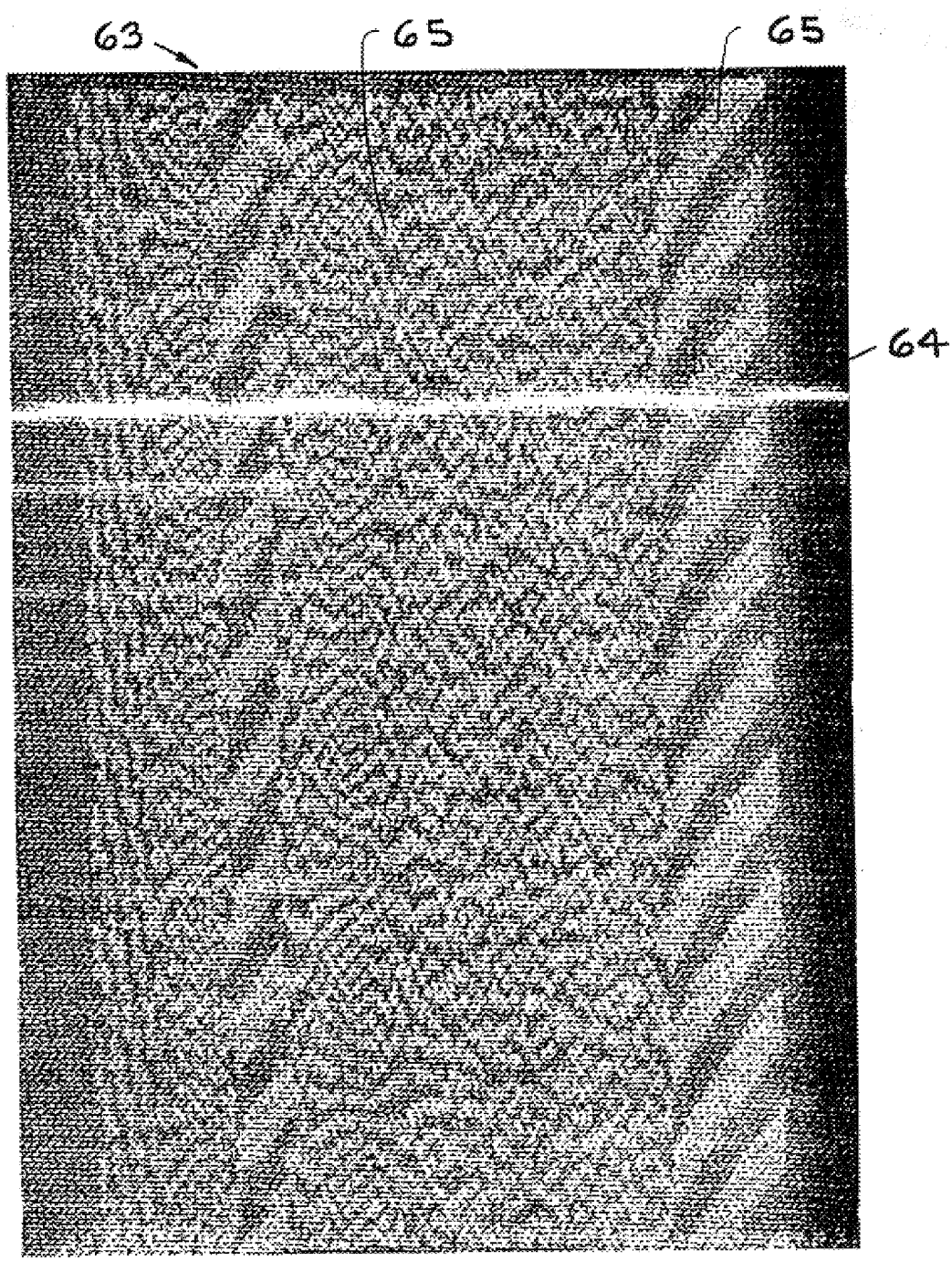

FIG. 19 is a photograph of a moire design 63 formed on denim according to this invention. The moire design includes a background area 64 which is the conventional indigo color of denim. A watered or wavy pattern of lighter areas 65 is formed on the background area 64. The lighter areas 65 are a faded indigo/white color. The moire look is formed by continuously changing the frequency of the laser beam from 200 Hz to 5,000 Hz as a line is scribed on the denim. The moire design can include a variety of lines of different thicknesses and spacings. The line thickness can be adjusted by changing the distance between the laser lens and the denim. The combination and ranges of operating parameters, and the resulting EDPUT range that produced the moire look, are even in Table 7.

J. Crazy Lines Look

Figure 20:
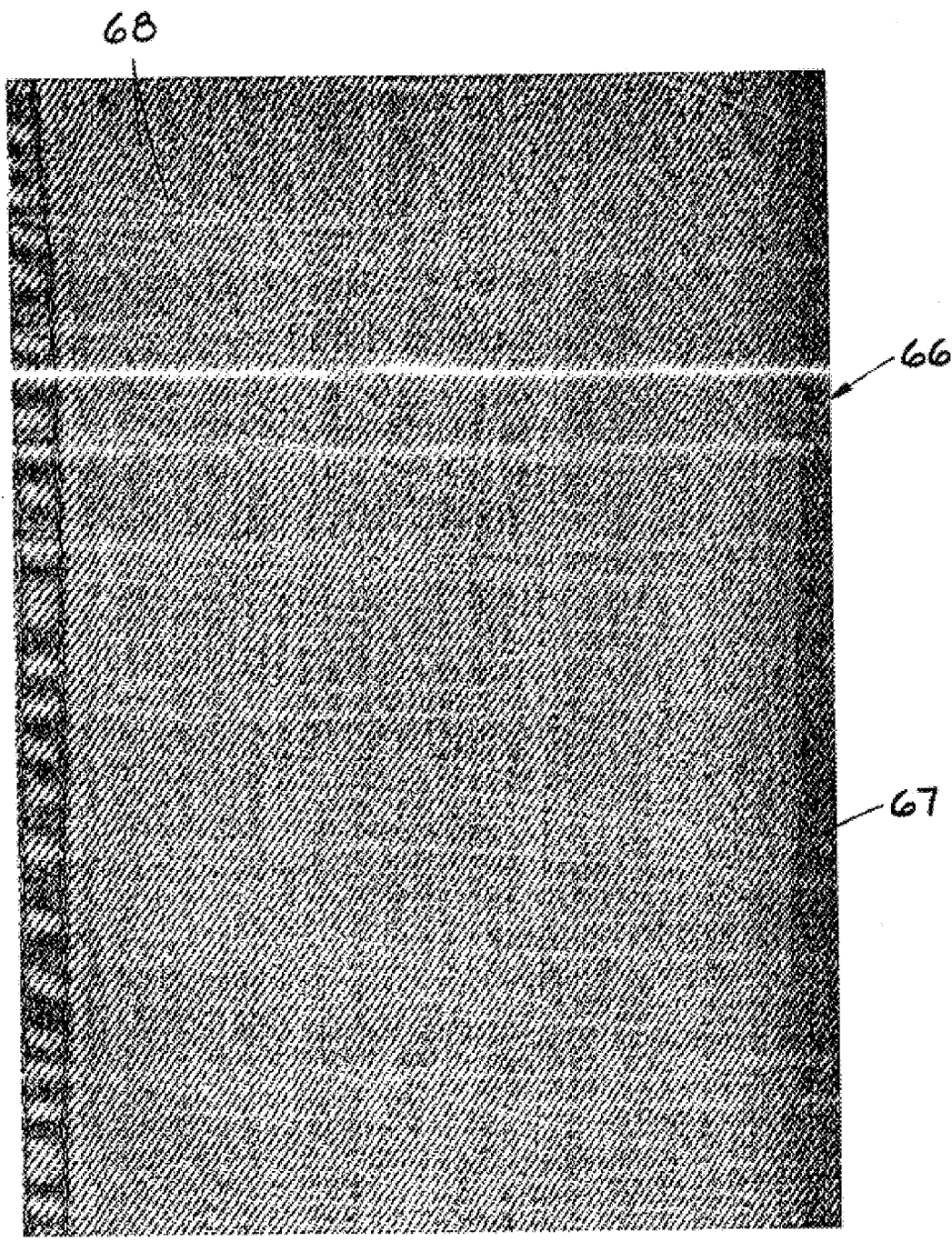

FIG. 20 is a photograph of a crazy lines design 66 formed on denim according to this invention. The crazy lines design includes a background area 67 which is the conventional indigo color of denim. A plurality of closely spaced thin lines 68 are scribed on the background area in a relatively crosshatched manner or a more random manner. The lines 68 are a faded indigo/white color. The crazy lines look is formed by the laser tracing the path of a scanned line pattern that was converted to a specific vector image. The combination and ranges of operating parameters, and the resulting EDPUT range that produced the crazy lines look, are given in Table 7.

EXAMPLE II

Leather and Vinyl

A. Graphic Images

Figure 21:
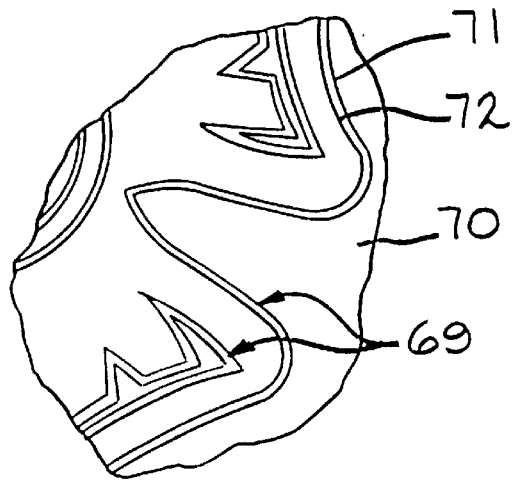

The technology developed and improved during these experiments showed how for the first time attractive graphic images could be imparted onto leather and vinyl goods such as, without limitation, purses, coats, jackets, belts, furniture, auto interiors, and other leather and vinyl goods without complete carbonization, burnthrough and/or melting. There simply is no cost effective technology currently available to produce such graphic images on leathers and vinyls. Numerous graphic images with thin lines, thick lines, continuous lines, discontinuous lines and even solid figures were scribed onto the leather or vinyl without complete carbonization, burnthrough and/or melting during these experiments. FIG. 21 illustrates an example of a graphic image 69 scribed on a leather background 70 according to this invention. The graphic image 69 is formed of a pair of closely spaced, parallel, curved lines 71, 72. The lines 71, 72 are the tan color of unfinished leather. The leather background 70 is a very dark brown color. The graphic image 69 is formed by the laser tracing the path of the scanned graphic image that was converted to a specific vector image. The combination and ranges of operating parameters, and the resulting EDPUT range that produced the graphic images, are given in Table 7.

B. Tufted Look

Figure 22:
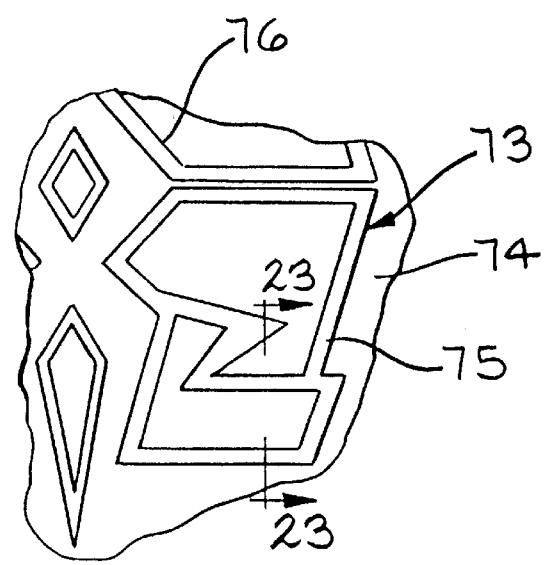
Figure 23:
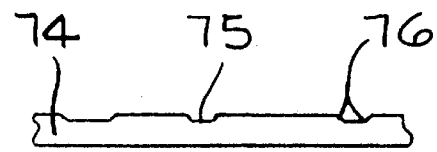

A novel design was created with a leather or vinyl material in which the material looked tufted in the area of the design after the scribing process was completed. The tufted look has the appearance of a 3-dimensional design. This unique look was created by changing the angle between the lens and the material before scribing. Instead of scribing with the laser beam perpendicular to the material, the laser beam was changed to an angle between about 5° and about 45° from perpendicular. If necessary, repetitive scribing with the laser beam can be used until the desired look is obtained. FIGS. 22 and 23 illustrate an example of a tufted design 73 scribed on a leather background 74 according to this invention. The tufted design 73 comprises relatively thick, shallow lines 75 scribed into the leather. The edges 76 of the lines 75 are angled outwardly. The lines 75 are a dark brown color and the leather background 74 is a very dark brown or black color. The combination and ranges of operating parameters, and the resulting EDPUT range that produced the tufted look, are shown in Table 7. The tufted look could also be created on artificial leather and some kinds of very thin natural leather by using design patterns consisting of thick dense lines and curves.

C. Hand Sewn Look

Figure 24:
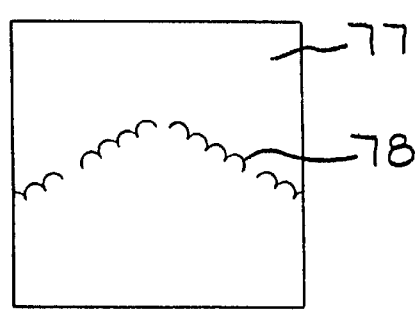

FIG. 24 illustrates an example of a new hand sewn look formed on leather according to this invention. It was learned that a design could be created which appeared on vinyl or leather material 77 to resemble hand sewn lines 78 by using laser oscillations in combination with an out of focus distance from the lens to the material. Preferably, the distance from the lens to the material is from about 142 mm to about 155 mm, and more preferably about 142 mm. The oscillating laser beam scribes a continuous semicircular or sawtooth waveform on the vinyl or leather material 77. This look could also be easily created on any fabrics including, without limitation, polyester, rayon, acetate, and cotton sheet, and fabrics made from blends of fibers such as natural, artificial and/or synthetic fibers. The combination and ranges of operating parameters, and the resulting EDPUT range that produced the hand sewn look on leather and vinyl, are shown in Table 7.

D. Logos and Identification

Various logos were scanned into the computer system and scribed onto leather and vinyl, providing a new market opportunity for automotive interiors and leather and vinyl goods. For example, and without limitation, logos of the automotive companies or automobile models could be scribed on the leather seating, headrests, vinyl dashboards, consoles, etc. Further as a result of this technology, logos or other identification could be scribed onto, without limitation, luggage, purses, shoes, belts, wallets, jackets, etc. It was learned that with the proper identification and control of the laser operating variables, a range of EDPUT could be realized that provided very high quality, precision and registration of intricate logos on leathers. The combination and ranges of operating parameters, and the resulting EDPUT which produced the logos and identification, are shown in Table 7.

EXAMPLE III

Organza, Nylon, Rayon, Acetate, Cotton, Polyester, Urethane, Cotton/Polyester Blends, Polyester/Rayon Blends, Lycra and Other Fabrics Made From Natural and Manmade Fibers and Blends A. Graphic Images A variety of graphic images were imparted onto organza, nylon, rayon, acetate, cotton, polyester, urethane, cotton/polyester blends, polyester/rayon blends, lycra and other fabrics made from natural and manmade fibers and blends. A more complete list of fabrics, fibers, threads and blends will be described below. In all cases the EDPUT was adjusted to overcome the technical barriers of complete carbonization, burnthrough and/or melting which have prevented the successful use of lasers in the past to scribe graphic images onto such fabrics. It was particularly surprising to view the extreme attractiveness of imparting gold type colored designs to acetate and rayon linings of jackets and coats by the laser method of this invention. The combination and ranges of operating parameters, and the resulting EDPUT range that produced the graphic images on these fabrics, are given in Table 7.

B. Relief Look

Figure 25:
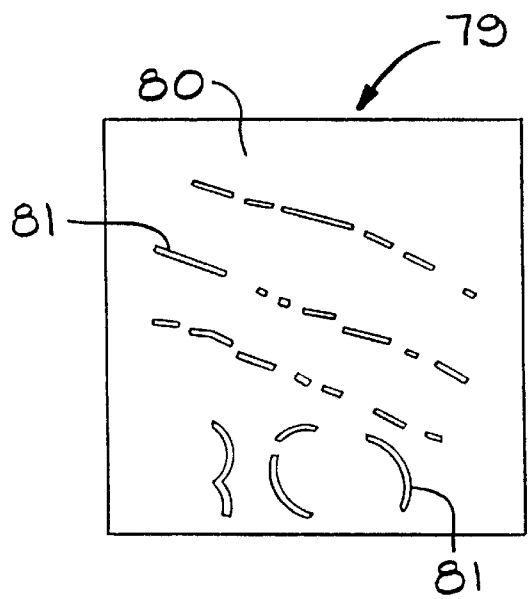

It was discovered during the experiments that a very muted design look could be obtained on polyester and polyester/rayon blends by reducing the laser power and increasing the laser speed above that used to create more bold graphic images on the fabrics. For example, FIG. 25 illustrates an example of a relief look 79 formed on red polyester 80 according to this invention. The particular operating conditions used created very muted design lines 81 which were at first hard to visualize. The design lines 81 are a slightly darker red color than the red polyester 80. It is believed that the muted design lines 81 are created by partially melting a portion of the fibers on the fabric surface. This type of look is often demanded for large objects like sofas and chairs which are upholstered in fine textiles or evening dresses designed to be elegant but not flashy. The combination and ranges of operating parameters, and the resulting EDPUT range that produced the relief look, are given in Table 7.

C. Metalized Look

In one experiment laser designs were scribed onto dark blue polyester fabric. The area where the laser scribed a particular design removed part of the dye, melted part of the fibers, and created a new gold metalized look. It is believed that the gold color is a characteristic of the fibers, the dye, and the finishing technology. This unique look would be very impressive in evening gowns and can otherwise only be created with expensive sewing of gold threads in the dark blue polyester. This look can also be scribed onto other dark polyester fabrics. The combination and ranges of operating parameters, and the resulting EDPUT range that produced the metalized look, are given in Table 7.

D. Nylon Open Cut Look

It was also possible to form perfect straight cuts through nylon by adjusting the EDPUT of the laser method. Hence new designs could be created with an open or see-through look in some sections of the design pattern where the laser beam fully penetrated the nylon fabric. For example, three adjacent parallel lines can be cut through the nylon to provide a see-through look. The combination and ranges of operating parameters, and the resulting EDPUT range that produced the nylon open cut look, are given in Table 7.

EXAMPLE IV

Figure 26:
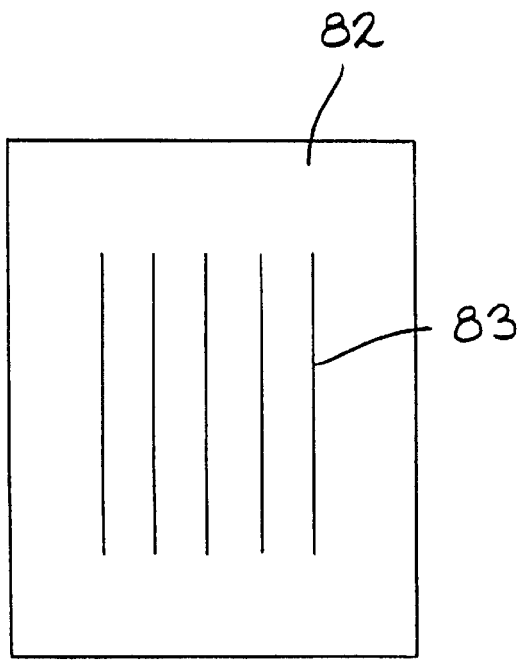
Figure 27:
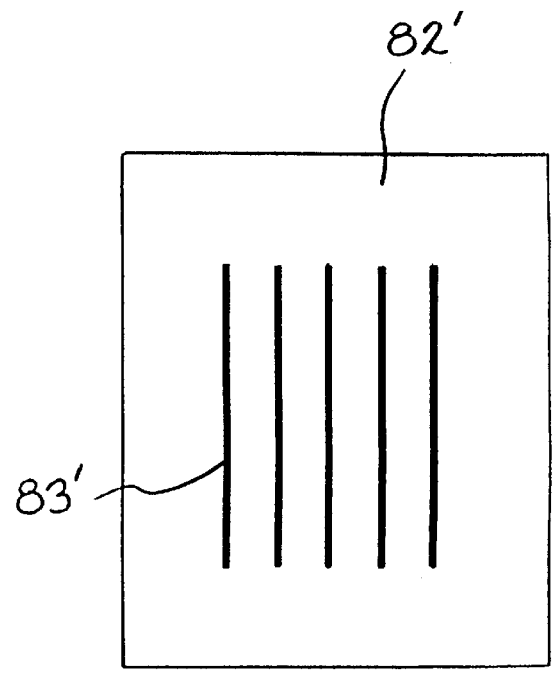

Unbleached Cotton and Cotton/Polyester Blends, and Bleached Cotton and Cotton/Polyester Blends A particularly unique concept was created by using the laser to scribe graphics onto unbleached cotton and cotton/polyester blends, and bleached cotton and cotton/polyester blends. Unbleached fabrics are fabrics in the unfinished state before bleaching and dyeing. Bleached fabrics are fabrics which have been bleached but not yet dyed. Usually, when the laser is used to scribe a graphic onto a fabric, the dye in the area of the graphic is selectively removed and the resultant graphic is lighter than the fabric color. It was discovered that by scribing the very same graphic onto unbleached fabrics and bleached fabrics, the graphic is barely noticeable if at all. Amazingly however, after the fabric is dyed the graphic appears in a color that is darker than the original dye since the dye is absorbed into the graphic at a different rate. As shown in FIG. 26, prior to dyeing a bleached cotton fabric 82, the laser scribed lines 83 are relatively light and appear thin. As shown in FIG. 27, after dyeing the fabric 82', the lines 83' are darker and appear thicker. The opportunity to create new and exciting graphics onto pillows, bedsheets, table covers, and a host of other products is now offered as a result of this discovery. The combination and ranges of operating parameters, and the resulting EDPUT range that produced the graphics on unbleached and bleached fabrics, are given in Table 7.

New Manufacturing Technology

As mentioned above, new manufacturing technology was developed during the experiments, including a process to simulate sandblasting and a process to simulate stonewashing. Table 8 below outlines the combination and ranges of operating parameters, and the resulting EDPUT that is preferred for the different manufacturing technologies.

TABLE 8

Operating Parameters and Resulting EDPUT Preferred for New Manufacturing Technology

| Manufacturing Technology | Power (watts) | Speed (mm/sec) | Oscillation (mm) | Distance (mm) | EDPUT (watts-sec/mm$^3$) |
|---|---|---|---|---|---|
| Sandblast Technology: | | | | | |
| Changing Distance | 10–25 | 250–762 | 0–1.5 | 127–203 | 0.185–3.225 |
| Changing Lines | 5–25 | 100–762 | 0–1.2 | 169–203 | 0.092–8.064 |
| Form Draping | 5–25 | 100–762 | 0–1.0 | 169–203 | 0.092–8.064 |
| Stencils Usage | 5–25 | 100–635 | 0–1.0 | 169–203 | 0.111–8.064 |
| Stonewash Technology | 7–20 | 100–635 | 0–1.0 | 169–203 | 0.155–6.45 |

EXAMPLE V

Process to Simulate Sandblasting

Often in the production of denim jeans, shorts, shirts, vests and jackets it is desired to create a worn look in certain areas of the material. For example, to create a worn look in denim jeans, the jeans are first sandblasted in three specific areas: the front right and left leg sections from the upper thigh to the knee and the back seat area. The process of sandblasting the jeans is very labor intensive, time consuming, costly and plagued with environmental problems. It was discovered that the same effect could be created using the laser with careful control of the EDPUT to control both the degree of dye reaction and the feathering of the same. There were four experiments attempted to create such a look and all four were considered quite successful.

A. Continuously Changing Distance from Lens to Denim

It was discovered that one of the simplest ways to create the sandblasted look was to continuously change the distance from the lens to the denim while scribing a solid pattern such as a filled-in circle, rectangle or square, or a pattern of closely spaced lines. This novel approach could be accomplished by allowing the computer numerical control system to automatically adjust the distance from the lens to the denim as the pattern is scribed. Alternately, if the equipment cannot be controlled in this manner, a cone, cup or wedge could be used as a form over which the denim is draped. For example, when the denim is draped over a cone and the solid pattern is scribed, the distance from the lens to the denim can be continuously changed from an out of focus distance (lower EDPUT) at the peripheral area of the cone to create a least worn, darkest look, to the focus distance (highest EDPUT) at the central area of the cone to create a most worn, lightest look. If desired, the reverse effect could be achieved by changing from the focus distance (highest EDPUT) at the peripheral area of the cone to an out of focus distance (lower EDPUT) at the central area of the cone. The use of a cup as a form would have the reverse effect from the use of a cone. The combination and ranges of operating parameters, and the resulting EDPUT range that produced the sandblasted look by the use of a cone, are given in Table 8.

B. Using a Design Pattern with Ever Changing Line Thickness and Spacing

It was also observed during the experiments that the sandblasted look could be created by using a design pattern with ever changing line thickness and spacing. The line thickness and spacing can be adjusted to create a whole series of different worn looks with different degrees of tapering of the degree of "wornness". Alternatively, the design pattern could be created as described earlier by a radial gradient graphic image which is converted to a black and white image by an error diffusion process, halftone process or pattern dither, diffusion dither or threshold process. The combination and ranges of operating parameters, and the resulting EDPUT range that produced the sandblasted look by this method, are given in Table 8.

C. Changing the EDPUT

The sandblasted look can also be achieved by scribing solid patterns or patterns of closely spaced lines onto denim with varying degrees of changes in the EDPUT in different portions of the pattern. For example, in the area where the denim is to look most worn, the operating parameters would be chosen such that the power is maximized, the speed is minimized, and the distance from the lens to the fabric is at focus (169 mm) so as to increase the EDPUT, and the oscillations are not present. Then to create varying degrees of lesser "wornness", the power can be reduced, speed increased, and distance from the lens to the denim changed to out of focus to reduce the EDPUT, and oscillations used. The combination and ranges of operating parameters, and the resulting EDPUT range that produced the sandblasted look by this method, are given in Table 8.

D. Reducing Area Stencils

Figure 28:
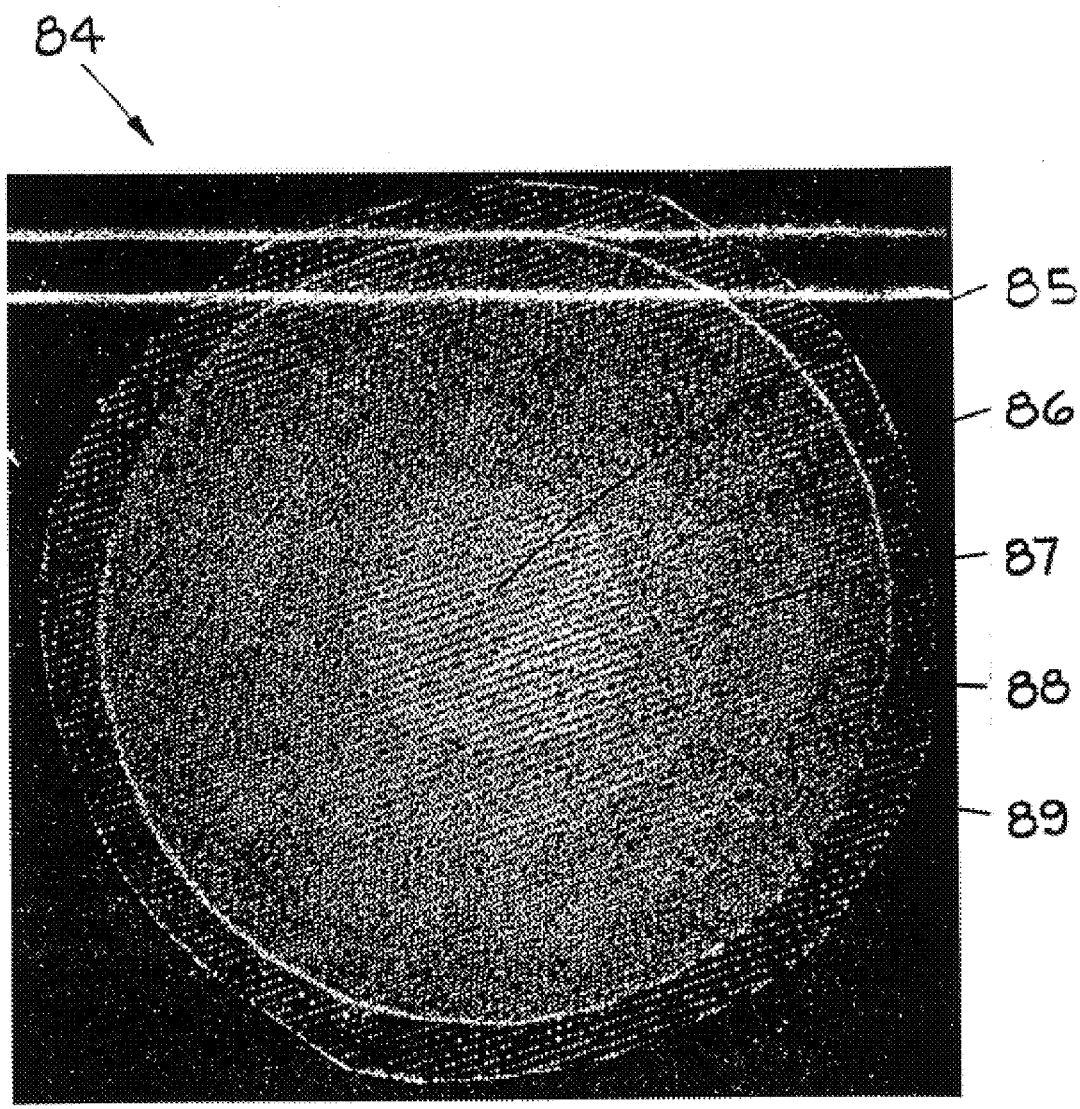

Finally, it was observed that the sandblasted look can formed on denim by the use of reducing area stencils. In this method, a ring is first used as a stencil to scribe a solid circle onto the denim. Then a second ring is used with the same outside radius but a smaller inside radius to scribe over the same area. Then a third ring is used with the same outside radius but an even smaller inside radius to scribe over the same area. Lastly, a fourth ring is used with the same outside radius but an even smaller inside radius, leaving only a small circle to scribe over the same area. It is understood that any number of rings can be used to form the sandblasted look by this method. In this way the design is more worn or lightest in the circular center area of the design and least worn or darkest in the annular perimeter area of the design. This technique was used to produce the faded sandblast design 84 shown in FIG. 28. The sandblast design 84 includes a circular center area 85 which is a faded indigo/white color. A first annular area 86 surrounding the center area 85 is a slightly darker color. A second annular area 87 surrounding the first annular area 86 is still darker in color. An annular perimeter area 88 is still darker in color. The color of the perimeter area 88 is only slightly lighter than the conventional indigo color of the denim background area 89. The combination and ranges of operating parameters, and the resulting EDPUT range that produced the sandblasted look by this method, are given in Table 8.

EXAMPLE VI

Process to Simulate Stonewashing

A particularly novel concept invented during the experiments was the manner by which the laser could be set up to replace the conventional method used to create a stonewashed look on denim. The conventional process is very expensive, consists of some four separate steps including enzyme washing and is plagued with environmental problems. Conversely, the laser method is relatively inexpensive both from a capital cost and an operating cost, consisting of only two steps (laser scribing and washing) and is free from environmental problems. The specific technique used to create this novel look was to first scribe contiguous solid patterns such as filled-in circles, rectangles or squares, or patterns of closely spaced lines, over the entire piece of denim. Alternately, a single pattern instead of contiguous patterns could cover the entire piece. An out of focus distance from the lens to the denim is used to spread the energy across a wider area. The EDPUT of the laser is carefully controlled to prevent burnthrough. This unique combination of processing conditions produced a surprising effect: the look of stonewashed fabric when the denim was first washed. The combination and ranges of operating parameters, and the resulting EDPUT range that produced the stonewashed look, are given in Table 8.

EXAMPLE VII

Process to Impart Identification onto Materials

The means to impart identification onto materials such as apparel or leather/vinyl goods are either printing, stamping, embossing, burning, dyeing, sewing or other expensive and often time consuming processes. It was discovered that the laser could be used to easily scribe, without limitation, letters, numbers, logos and other identification marks on a wide range of materials in a very quick and inexpensive method. The specific design could simply be scanned into the computer and the numerical control system would scribe the exact set of letters or numbers onto the material. The laser system can be set up for continuously scribing pieces of the material, with the numerical control system programmed to increment by one the next identification number or letters for the subsequent piece of material to be scribed. Alternately, a screen, mask or template could be used on top of the material, such that as the laser scribes a solid pattern over the template, the specific letters or numbers are etched into the material Finally, the laser computer software could be programmed to allow the direct entry of alphanumeric characters which could then be adjusted for size and weight. The numerical control system would then directly scribe the desired identification on the material. This last technique was used to serialize garments, shoes and boots by scribing codes on the materials and on the inside of the leather shoe or boot. The preferred laser system disclosed in FIG. 1 was particularly suited for this type of new work since the laser is very capable of maintaining almost perfect registration and repeatability of the alphanumeric characters in a specified area. Further, the images are of such precision, that small characters less than 3 mm in height can be scribed with quite acceptable readability. This technique could be used to identify garments and goods for inventory control and to prevent copying or counterfeiting of same.

Other Discoveries

Figure 29:
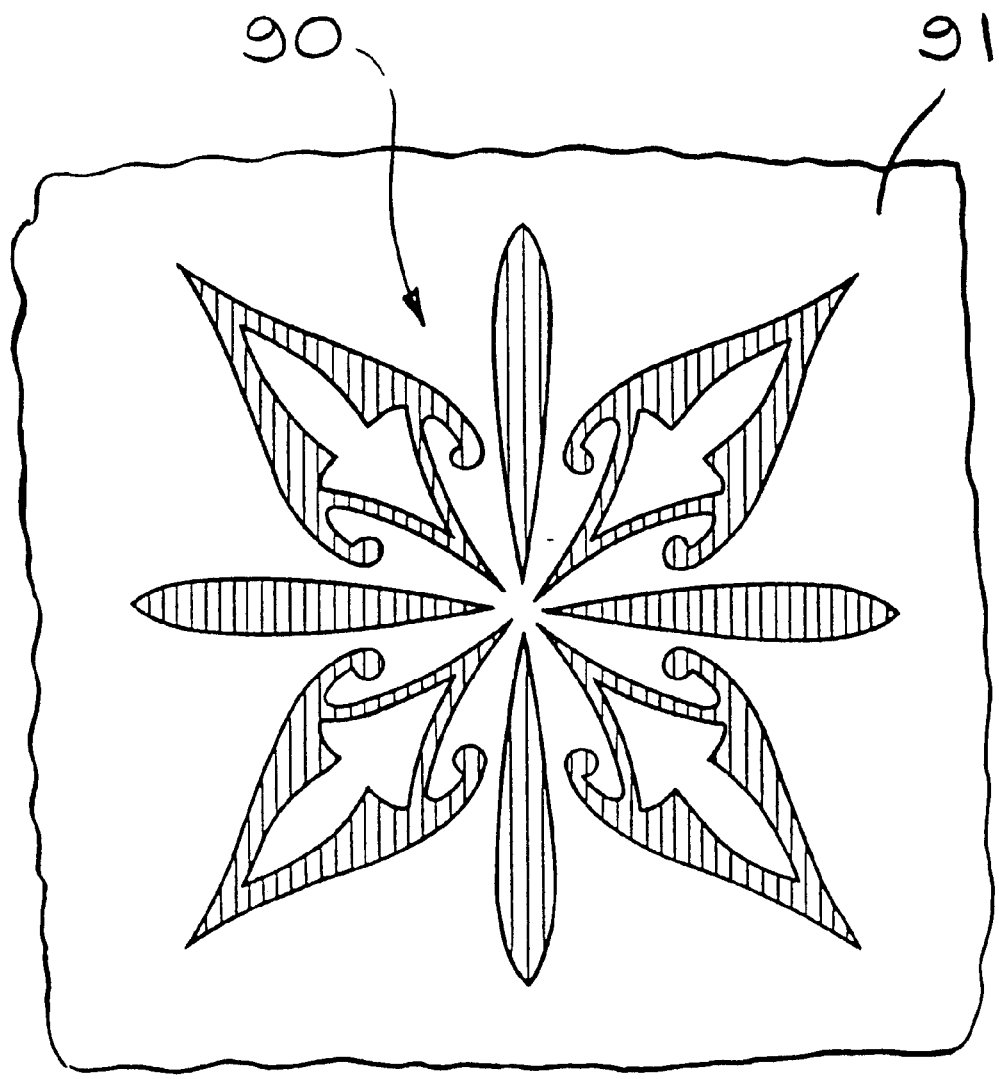

A surprising new invention was accidentally discovered in the experimental trials. All the graphics that had previously been imparted onto the materials were basically monochrome such that the color of the graphic was a lighter shade of the base material that was dyed to a certain color. However, it was discovered that if a substrate was placed between the material and the laser, and then the laser was used to scribe the graphic onto the material, a surprising effect was realized. The laser beam passed through the colored substrate and "ironed" that color onto the graphic scribed on the material. For example, a thin red polyester fabric was placed on top of a white cotton fabric and the laser scribing process was initiated to scribe a star design on the white fabric. As illustrated in FIG. 29, the resultant design was a red colored star 90 on the white cotton fabric 91. Hence for the first time ever, this invention has revealed a unique laser method to achieve colored graphics on materials. This invention can be applied to any material: rubber, wood, metal, plastic, ceramics, glass, fabrics, leathers, vinyls, and other materials. The colored substrate through which the laser beam passes can be almost any colored substance which will allow the laser beam to pass through, such as thin materials composed of a number of different natural or synthetic fibers, colored threads, plastics or foils. Preferably, the colored substrate is positioned close to the material. When this invention is used to scribe colored graphics on fabric, leather or vinyl materials, the preferred EDPUT is usually the same as for monochrome graphics.

Another process was also discovered for scribing colored graphics onto a material. In this process, a gaseous dye is injected into the working area where the laser beam is scribing a graphic on a material. As shown in FIG. 1, the gaseous dye can be injected into the working area from a tank 24. Laser created graphics of various colors may be achieved by using different colors of gaseous dye.

A third process was discovered for scribing colored graphics on fabric, leather and vinyl materials. This process uses threads (fibers) or dye that change to different colors when they are exposed to different amounts of heat energy. Thus, the laser system can be programmed to vary the level of EDPUT during scribing to change the colors of the threads or dye. Another process is to use different colored dyes in different sections of the material where the graphic is to be scribed.

It was learned in the experimental trials that the effects produced by the laser scribing process are usually two color effects, such as black/white, indigo/white, dark indigo/light indigo, dark/gold, dark red/light red, etc. For example, where the laser scribes the graphic a light effect (white) is established against the darker background of the material (black). However, in order to reproduce photographic type images, there was a need to provide more of a greyscale process which created shaded images. Therefore, a process was invented which for the first time allows a photographic image to be scribed onto materials with amazing greyscale type detail. The process is first to scan a picture of a person or thing into the computer, or import a clipart image into the computer, or alternatively take a picture with a digital camera and input the image into the computer. Second, the image is converted to a black and white image preferably by the error diffusion process or by the halftone, pattern dither, threshold or diffusion dither process with the use of an image editing software program such as Adobe Photoshop or shareware program, GVPD or other such programs. Then the image is converted to the laser numerical control program language. The image can then be scribed onto materials with a greyscale type pattern and detail. This technique was used to scribe photographic type images of people (taken from a digital camera), clipart images of articles such as dice, and scanned images of wallpaper designs on materials. The scribed images were very detailed and attractive. This is the first time a laser has been used to directly scribe a photographic type image onto materials. The key to this invention is to process the image in a manner which simulates greyscale but is a true black and white graphic for processing with the laser numerical control computer program. If the image is simply converted to a black and white image typical of laser engraving processes on metals and plastics, then the detail will be lost and only black and white outlines of the image will be formed.

Another surprising result was discovered when this same technique was used to scribe a picture of a person on shiny vinyl material. The resulting image appeared "holographic" in nature in that at certain angles the details of the picture could not be ascertained, but at other angles the picture came in quite clearly. This created a very unusual and attractive image on such material.

Two other techniques were successfully tried to scribe a greyscale type image on materials. In the first technique, different greyscales were created by repetitive laser scribing. In this case the first line was created from one pass of the laser beam at low EDPUT and thus created a very muted shade not much different from the base substrate. Then a second line was created with the same procedure but with a second pass of the laser beam over the same area. This created a somewhat lighter greyscale. This process could then be repeated several times to create different levels of greyscale such that a photographic type image could be reproduced with good readability. The second technique was to scribe sections of the image at different EDPUT to produce different shades or greyscales. This type of process could be made programmable such that the numerical control system could permit the laser to scribe different sections of the image at different EDPUT in a continuous pattern and therefore at different shades of greyscale. This new process then could be used in a similar fashion as a screen printing or transfer printing process which produce photographic type images on T-shirts, caps and jackets. A customer would either provide the laser service center with a photographic image to scan or a digital camera would be used to digitize an image on site Then the image would be converted to a vector format and the laser computer system would be programmed or manually changed to produce different greyscales to generate the image on different materials.

It was further discovered in the experiments that the particular graphic also has an influence on the propensity of the laser beam to cause complete carbonization, burnthrough and/or melting of the material. Specifically, graphics with intersecting lines and discontinuous patterns have an increasing propensity to cause complete carbonization, burnthrough and/or melting. Accordingly, intersecting lines should generally be kept to a minimum because at any point if the laser beam contacts the material twice, the potential for complete carbonization, burnthrough and/or melting increases, particularly at higher powers and lower speeds. Discontinuous graphics produced by constantly varying the laser frequency to cause pulsing of the laser beam should usually be minimized, because pulsing increases the potential for burnthrough. On the other hand, discontinuous graphics produced under computer control without pulsing the laser beam generally have no impact on burnthrough. Closely spaced lines and repeated laser shots in one place can also increase the propensity for complete carbonization, burnthrough and/or melting. It was discovered that the preferred EDPUT range narrowed as the graphic became more complex as described above. However, through the use of computer designed experiments it was possible to identify a range of EDPUT that produced the desired results even for complex graphics. For example, to produce a complex shooting star type graphic on cotton required the use of an EDPUT of about 0.5 watts-sec/mm$^3$.

It was also discovered that the preferred EDPUT will often change depending on the size of the graphic. A smaller graphic often uses a lower EDPUT, while a larger graphic often uses a higher EDPUT. It is believed that a lower EDPUT is often preferred for a smaller graphic because the graphic has more closely spaced lines.

Adjustments to the galvanometer setting times can also help to prevent the initial creation of a hole when the laser beam is first turned on and the initial surge of energy contacts the material. The galvanometer setting times control when the laser beam comes on relative to when the mirrors of the mirror system start to move. The best adjustment is to set the galvanometer setting times so that the mirrors begin to move just before the laser beam comes on. Thus, the first pulse of energy is distributed over a wider area of material, minimizing the potential to create a hole in the material. Newer laser systems often automatically compensate for this surging in the circuitry and program.

Another new technique is to use repetitive scribing of the laser beam at low EDPUT, preferably at EDPUT levels below about 3 watts-sec/mm$^3$. During the first pass of the laser beam, the graphic formed on the material is only partially complete, but complete carbonization, burnthrough and/or melting are avoided. During repetitive passes of the laser beam, the graphic is completed with the desired quality.

Encapsulating the working zone between the lens and the material in an inert gas may also reduce the tendency for complete carbonization, burnthrough and/or melting. This technique can also produce new effects in graphics. In general, any gas can be used in the working zone to create a new effect. As shown in FIG. 1, the gas can be injected into the working zone from a tank 24.

It was also learned that some level of carbonization, burnthrough and/or melting can be acceptable and sometimes desired such as with the frayed or thread barren look described above. The level of carbonization, burnthrough and/or melting can be controlled by proper selection of the EDPUT.

During the experiments, it was learned that the width of the lines of the graphic can be changed by utilizing two approaches. In the first approach, the distance from the lens to the material is changed from the focus distance of 169 mm to an out of focus distance of 142 mm or 180 mm to create thicker graphic lines. In the second approach, the laser beam is oscillated as described above to create thicker graphic lines.

The normal operating frequency of the laser used for the experiments was 5,000 Hz. This frequency produced a continuous line when the laser was used to scribe a line on the material. However, in order to create an additional effect of discontinuous lines or a stitched pattern, a new technique was used to pulse the laser at a very low frequency from about 200 Hz to about 2000 Hz. By varying the frequency during the scribing, it was possible to create a more randomized pattern on the material.

Another new technique produces a unique look by modulating or moving the material as the laser is scribing the graphic. For example, this technique can produce a random wash out look that is quite attractive.

Numerous experiments demonstrated that many new graphics can be created using a variety of stencils or masks. Dot matrix type patterns can be utilized to create some interesting new effects similar to sandblasting. Letters and numbers can be imparted onto the materials either by 1) scanning in the specific letter or number or using built-in fonts and allowing the numeric control mirror system to guide the laser graphic, or 2) by utilizing stencils over the material much like screen printing.

In order to create a variety of laser scribed graphics on different materials, a number of novel inventions were utilized such as the use of cones, wedges and cups, the use of designs with ever increasing or decreasing line spacing and thickness, and the use of grids with patterns created with different EDPUT. However, it was realized that these types of effects and many others could be accomplished by an integrated laser system in which the operating parameters can be effectively controlled to achieve the preferred EDPUT as the specific graphic is scribed on the material. The integrated computer, scanning device, numerical control system and laser can then work together to create a variety of existing and new graphics on the materials and to avoid or control carbonization, burnthrough and/or melting.

The laser used in the method of this invention can be any conventional laser capable of functioning as described above. A preferred laser is the Stylus $CO_2$ laser manufactured by Excel/Control Laser illustrated in FIG. 1. Other lasers such as a well-known Nd:YAG laser can also be used in this invention New lasers such as diode lasers can likely be utilized in a similar fashion. The laser and material can be positioned so that the laser beam is vertical (after it is reflected from the mirrors) and the material horizontal, or the laser beam can be horizontal and the material vertical.

The laser beam can be oscillated as described above, modulated or otherwise manipulated to produce different effects on the graphic. Suitable means include electro-optic modulators, acoustic optic modulators, laser-oscillated voltage, On and Off synchronous mechanical devices, masking methods, methods of applying mechanical shift, or systems in sync with laser scanning operations The computer used in the method can be any electronic controller embodied as any conventional computer, microprocessor, or other similar electronic computing apparatus. Additionally, any suitable software or computing language can be used to control movement of the laser, mirrors and/or material.

This invention provides for the production of unique laser graphics on any types of fabrics, fibers and/or threads. The term "fabrics" when by itself herein will include all these materials. The materials can be natural or manmade. Natural materials include cotton, wool, flax and natural silk. Manmade materials include artificial materials which are often derived from cellulose, such as rayon and acetate. Manmade materials also include synthetic materials which are often derived from petroleum, such as nylon, polyester and lycra. Any blends of fabrics, fibers and/or threads can be used. Blends can be created inside fibers or threads by spinning processes and/or inside fabrics from different fibers and threads by weaving. Other means can also be used to make blends. The fabrics can be woven, nonwoven, knitted, or manufactured by other methods. Specific fabrics and fibers include, without limitation, denim, cotton, polyester, rayon, nylon, wool, natural and artificial silk, acetate, flax, polyamide, lavsan, half wool, raincoat fabric, woven and nonwoven canvas, and blends thereof. A particularly preferred fabric is denim, a cotton fabrics which differs from other cotton fabrics by the method of manufacture. Other preferred fabrics and fibers are cotton, polyester, lycra, elastomer treated nonwoven polyester, corduroy, velour, organza, nylon, rayon, acetate, and blends thereof. Many types of fabrics can be produced from cotton fibers, including without limitation, clothes, sheets, coats, sweaters, and knit.

The invention also provides unique laser graphics on any types of leathers or vinyls. Preferred leathers include, without limitation, kid leather, lamb leather, pig leather, chamois leather, calf leather, suede and artificial leather. Vinyl is another preferred material.

Any types of graphics can be formed on the materials in accordance with this invention. By using the technology of this invention, any graphic can be realized, particularly with the assistance of the computer. The graphics can be formed by using a moving or stationary laser and/or mirrors, and a moving or stationary material, and by many other means. Complex graphics can be formed by employing mirrors, lenses, shutters, or combinations thereof. The graphic can be continuous or discontinuous, straight or curved, and simple or intricate. Thick or thin lines of graphic can be formed. The graphic can be single or multiple color, full or partial penetrating, relief or flat, and combinations thereof.

This invention allows for the creation of standard graphics typically provided by more expensive means, as well as the creation of entirely new graphics that are not possible to achieve by any other means thereby providing new products for expanded market opportunities. For example, the intricate laser graphics imparted onto leathers and vinyls are unique because alternate processes to impart such graphics onto these materials are rare and totally cost inefficient. This invention can then be used to impart significant graphics onto car leather interiors, jackets, boots, belts, purses and wallets which are typically only differentiated by color.

The graphics are formed by contact of the laser beam with the surface of the material. The laser beam selectively changes the surface chemistry and/or surface physical properties of the material. Usually, the laser beam selectively destroys and/or selectively changes a small portion of the material and/or dye. The ratio of the material destroyed or changed to the dye destroyed or changed is a function of the dye composition, quantity and level of fixation, and the material composition and construction such as type and interlacing of fiber. The laser beam can form a graphic on the material by destroying, melting, shrinking, rumpling, crumpling, creping, watering or crimping the material.

The materials with graphics formed in accordance with this invention can be used to make clothing, footwear, purses and wallets, uniforms, household goods, vehicle interiors, furniture coverings and wall coverings. This invention can offer unique material graphics to, without limitation, the fashion industry, footwear market, furniture business, home decorative market, military, automotive industry, and boat and airline industries.

The laser method of this invention can be practiced in a retail location for the sale of apparel, footwear, leather goods, furniture, caps, or the like. The laser method can also be practiced at a warehouse which stores goods for multiple retail outlets. Further, the laser method can be practiced at a mill or manufacturing operation, or at a laundry operation. Moreover, the laser method of this invention can also be practiced at a mall, amusement center, or photographic outlet.

The graphics can be formed on a specific portion of a product, such as the pocket, collar, sleeve or cuff of an article of clothing, or the seat of a piece of furniture or a vehicle. Thus, the laser method can be used in unit applications where a graphic is formed on a piece of material to make a specific portion of a product, as well as linear applications where a graphic is formed on a roll of material which is subsequently cut into shapes.

The laser method can be used to impart new graphics on leather, vinyl and cloth interior components of automobiles or other vehicles in a unit application. Hence, an automobile dealership can have a laser system on site to produce custom graphics for customers on a variety of automobile interior components such as visors, headliners, headrests, arm rests, consoles, mats, carpets, dashboards, gear shift boots, and the like.

A surprising benefit of this invention is that fabric, leather and vinyl materials with graphics produced by this invention have mechanical properties and chemical stability superior to materials with graphics produced by chemical dye processes. Table 9 below illustrates this improvement in chemical stability of the materials with graphics formed by the laser method of this invention. Samples of material were subjected to washing and rubbing treatments and then judged for the amount of color retained, uniformity of color, and depth of color. The scores in the table use 5 as the highest rating, essentially equivalent to untreated material. In all cases, the rating of the laser designed material was equal to or higher than the rating of the chemical dyed material following high temperature soap washing, room temperature washing, and dry and wet friction testing. As noted above, the quality of the material ultimately depends on the desires of the customer, and the present invention is not limited to any particular rating system.

TABLE 9

Chemical Stability of Laser Design Materials vs. Chemical Design Materials
Design Key: SHTW = Simulated High Temperature Soap Wash, RTW = Room Temperature Wash, DFT = Dry Friction Test, WFT = Wet Friction Test

| Material | Design | SHTW | RTW | DFT | WFT |
|---|---|---|---|---|---|
| Rayon | Chemical | 5 | 4–5 | 4 | 4 |
|  | Laser | 5 | 4–5 | 4–5 | 5 |
| Nylon | Chemical | 5 | 4 | 4 | 4 |
|  | Laser | 5 | 5 | 5 | 5 |
| Nonwoven Canvas (Cotton/ Rayon) | Chemical | 5 | 4 | 4 | 4 |
|  | Laser | 5 | 5 | 5 | 5 |

TABLE 9-continued

Chemical Stability of Laser Design Materials vs. Chemical Design Materials
Design Key: SHTW = Simulated High Temperature Soap Wash, RTW = Room Temperature Wash, DFT = Dry Friction Test, WFT = Wet Friction Test

| Material | Design | SHTW | RTW | DFT | WFT |
|---|---|---|---|---|---|
| Pig Leather | Chemical | 5 |  | 4 | 3–4 |
|  | Laser | 5 |  | 5 | 4–5 |

Table 10 below illustrates the higher rated mechanical properties of the laser designed materials versus the conventional designed materials, particularly for the heavy wool laser design.

TABLE 10

Mechanical Properties of Laser Design Materials vs. Chemical Design Materials
Design Key: Virgin = No Design, Chemical = Chemical Design, Laser = Laser Design. Sample Size = 50 × 200 mm

| Material | Design | Load (Kg) Warp | Load (Kg) Woof | Elongation (%) Warp | Elongation (%) Woof |
|---|---|---|---|---|---|
| Rayon | Virgin | 232.4 | 229.7 | 15.2 | 16.9 |
|  | Chemical | 230.9 | 229.1 | 14.9 | 16.7 |
|  | Laser | 231 | 229.5 | 14.9 | 16.8 |
| Nylon | Virgin | 256.8 | 252.4 | 19.8 | 20.2 |
|  | Chemical | 251.4 | 250.3 | 19.2 | 20.0 |
|  | Laser | 256.6 | 251.8 | 19.4 | 20.1 |
| Nonwoven Canvas (Cotton/ Rayon) | Virgin | 210.2 | 208.7 | 18.7 | 19.2 |
|  | Chemical | 208.9 | 207.4 | 18.2 | 18.8 |
|  | Laser | 209.1 | 207.8 | 18.5 | 18.8 |
| Pig Leather | Virgin | 1.4 |  | 35 |  |
|  | Chemical | 1.4 |  | 35 |  |
|  | Laser | 1.4 |  | 35 |  |
| Heavy Wool | Virgin | 248.8 | 192.1 | 17.2 | 17.3 |
|  | Chemical | 111.2 | 46.4 | 5.7 | 5.2 |
|  | Laser | 247 | 190.1 | 17 | 17 |

Figure 30:
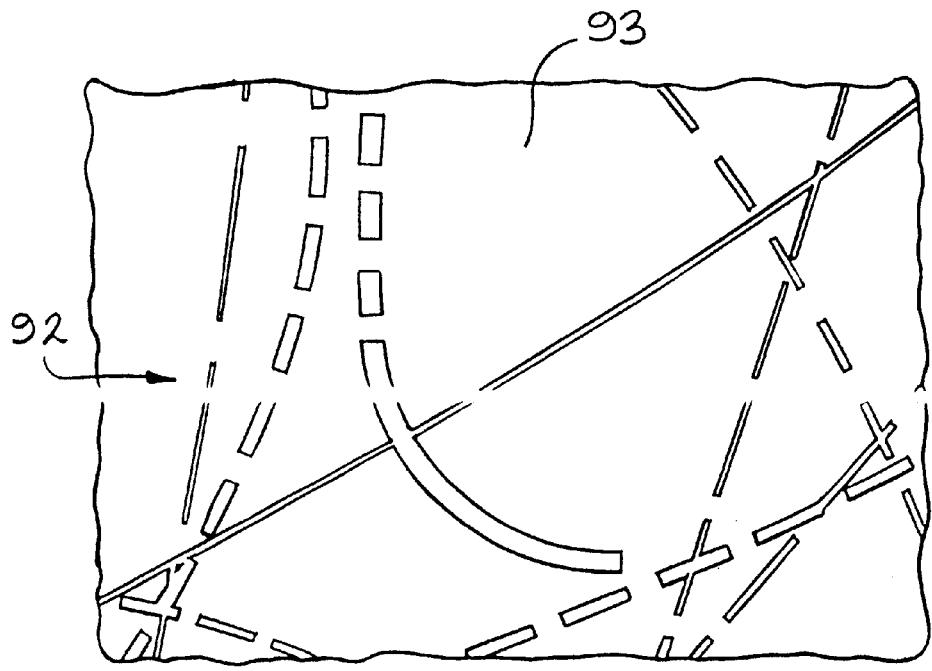
Figure 31:
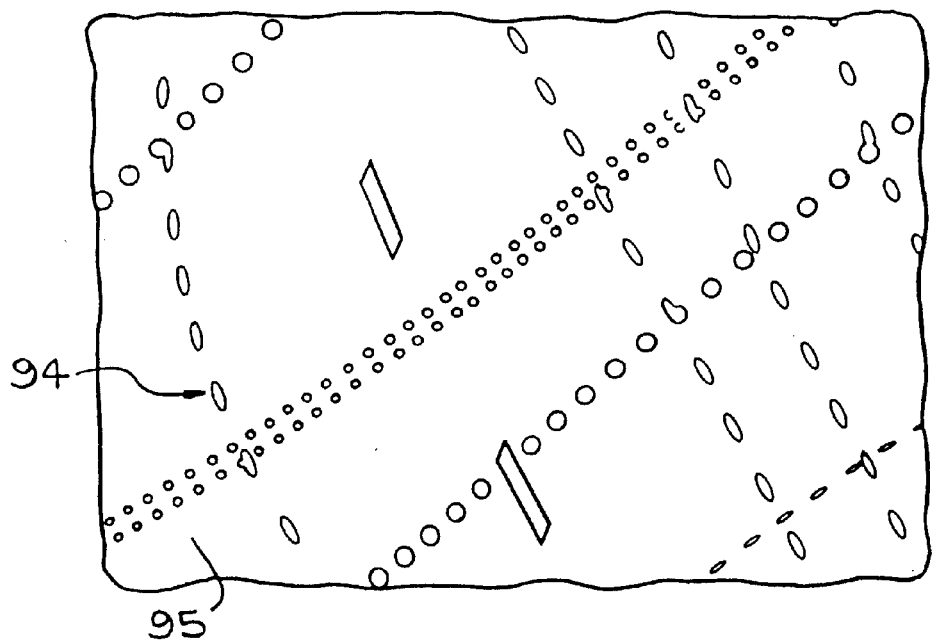
FIG. 31 is a drawing of a graphic formed on leather, including thick and thin, discontinuous, and straight and curved lines.

FIGS. 30 and 31 are additional drawings of laser designs formed on a fabric and a leather in accordance with this invention. They demonstrate that a variety of different graphics can be formed on a variety of different materials without complete carbonization, burnthrough and/or melting.

FIG. 30 illustrates a novel and attractive laser graphic 92 formed on denim 93. This graphic includes thick and thin, continuous and discontinuous, and straight and curved lines. This new fashion concept is expected to be popular with consumers who purchase denim jeans.

A graphic 94 formed on pig leather 95 is illustrated in FIG. 31. Such laser graphics formed on leathers and vinyls are unique in and of themselves since alternate processes to impart graphics onto these materials are rare and totally cost inefficient. This invention can thus be used to form graphics onto vehicle leather interiors, jackets, boots, wallets and purses which are typically only differentiated by color.

Figure 32:
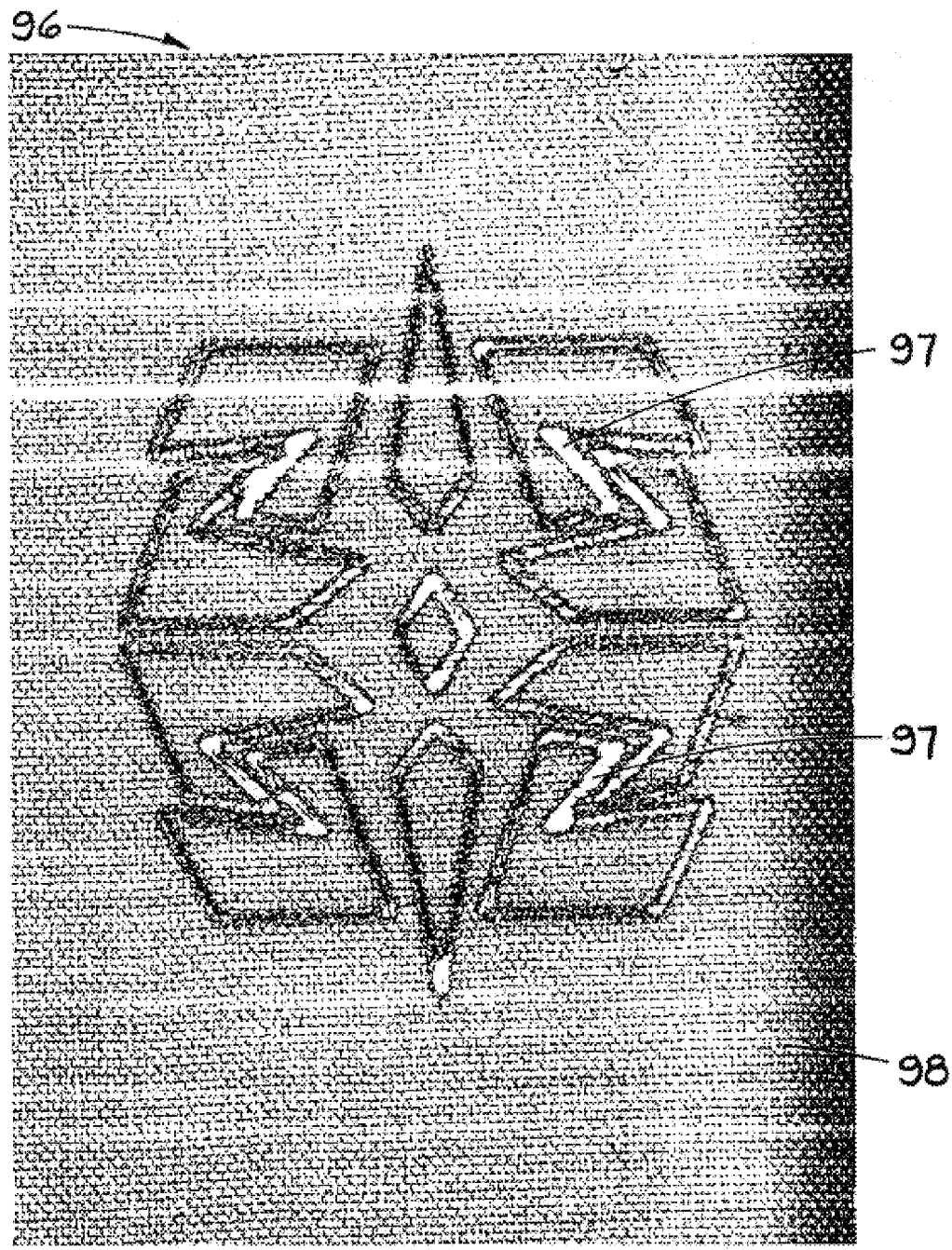
FIGS. 32 and 33 are photographs of denim samples in which the laser beam caused complete carbonization, burn-through and/or melting at the point of contact, resulting in complete penetration and the formation of holes in the denim.
Figure 33:
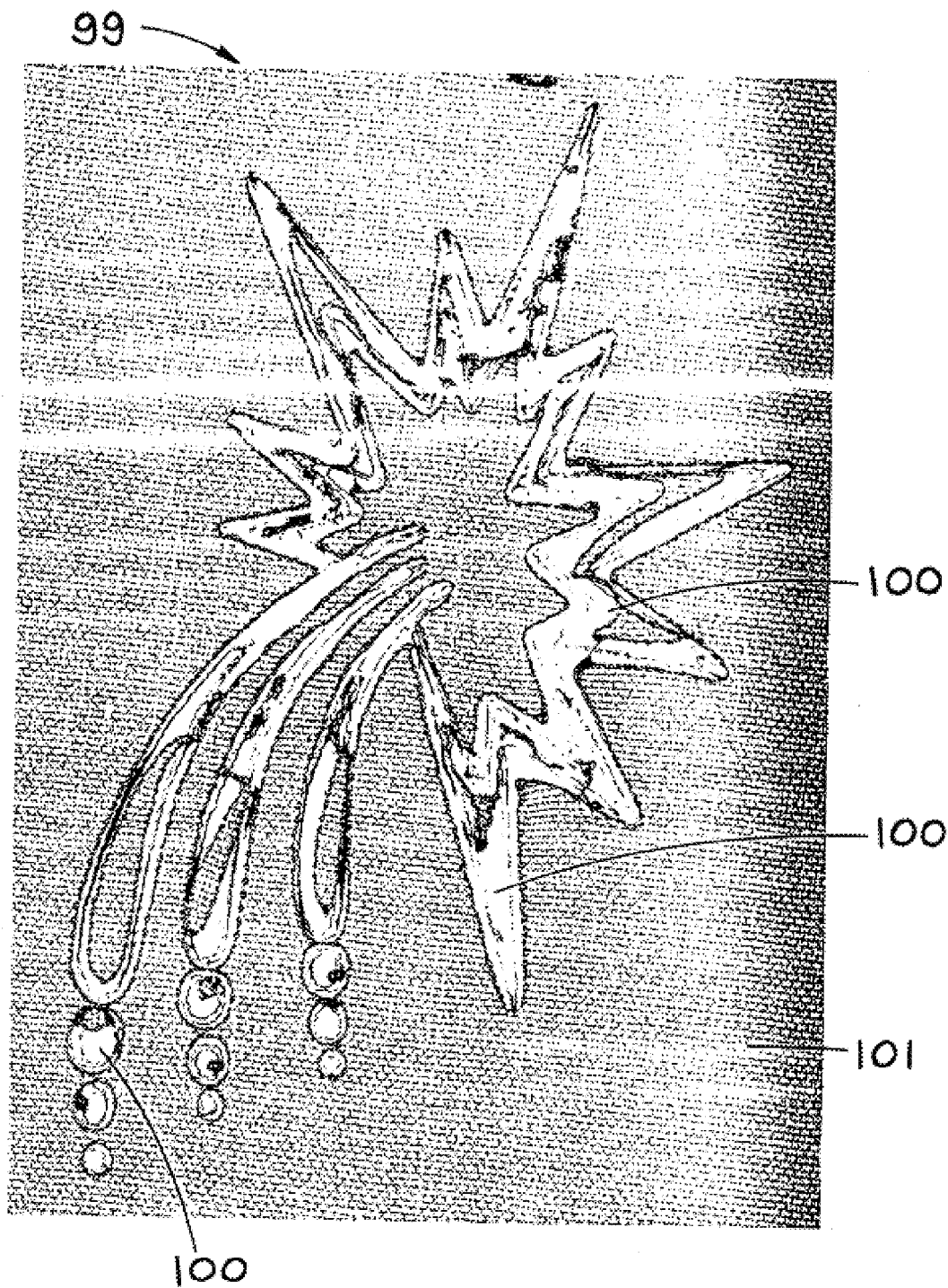

FIGS. 32 and 33 were considered unsuccessful attempts at scribing graphics on denim samples. In these attempts, the EDPUT was not adequately controlled during the laser scribing. The graphic 96 shown in FIG. 32 has areas 97 in which the laser beam caused complete carbonization, burnthrough and/or melting of the denim 98, resulting in complete penetration and the formation of holes in the denim. Similarly, the graphic 99 shown in FIG. 33 has relatively large areas 100 of complete carbonization and burnthrough of the denim 101.

Other Experiments

Previous experiments have determined preferred operating speeds for a variety of different fabric, leather and vinyl materials. The preferred operating speed is a function of the type of material, the thickness of the material, the construction of the material, the type of graphic formed on the surface of the material, as well as the other laser operating parameters discussed above. For a fixed set of other laser operating parameters, the preferred operating speed is maintained at a level above a threshold speed where the laser beam fully penetrates the material and results in complete carbonization, burnthrough and/or melting. However, the preferred operating speed is maintained at a level below a maximum speed where a visible graphic is not formed on the material. Table 11 below shows the preferred operating speed for a variety of different materials, along with the type of laser graphics that can be formed on these materials. The variation in preferred operating speed is due to the factors mentioned above.

TABLE 11

Preferred Operating Speed for Laser Graphics on Different Materials

| Material (Woven, Nonwoven or Knitted) | Preferred Operating Speed (mm/sec) |
| --- | --- |
| Cotton | 100–1500 |
| Rayon | 100–1500 |
| Acetate | 100–1500 |
| Nylon | 250–1500 |
| Artificial Fiber | 100–1500 |
| Half Wool | 250–1500 |
| Wool | 100–1000 |
| Flax | 100–1500 |
| Natural Silk | 250–1500 |
| Artificial Silk | 250–1500 |
| Mixed Fiber Fabric | 100–1500 |
| Chemical Fiber Fabric | 100–1000 |
| Polyamide, Polyamide Chloride | 100–1000 |
| Lavsan | 100–1000 |
| Pig Leather | 100–1000 |
| Kid Leather | 100–1000 |
| Box Calf Leather | 100–1000 |
| Chamois Leather | 100–1000 |
| Artificial Leather | 100–1000 |
| Polyester | 250–1500 |
| Vinyl | 100–1000 |
| Denim | 100–1500 |

Table 12 below shows the preferred operating speed for laser graphics on certain specific materials.

TABLE 12

Preferred Operating Speed for Laser Graphics on Specific Materials

| Material | Preferred Operating Speed (mm/sec) |
| --- | --- |
| Artificial Leather | 30–70 |
| Rayon Silk (100%) | 1180–1220 |
| Nylon Silk (100%) | 1180–1220 |
| Cotton Velveteen (100%) | 780–820 |
| Heavy Half Wool (62% Wool, 23% Rayon, 15% Nylon) | 580–620 |
| Heavy Wool | 380–420 |
| Nonwoven Canvas (70% Cotton, 30% Rayon) | 880–920 |
| Raincoat Fabric (100% Cotton) | 1180–1220 |
| Shirt & Chemise Fabric (100% Cotton) | 1180–1220 |
| Clothing Fabric (50% Cotton, 50% Polyamide) | 980–1020 |
| Denim Fabric (100% Cotton) | 980–1020 |
| Chamois Leather Suede | 5–30 |
| Pig Leather | 30–70 |

Alternate Embodiments of the Laser Method

Figure 34:
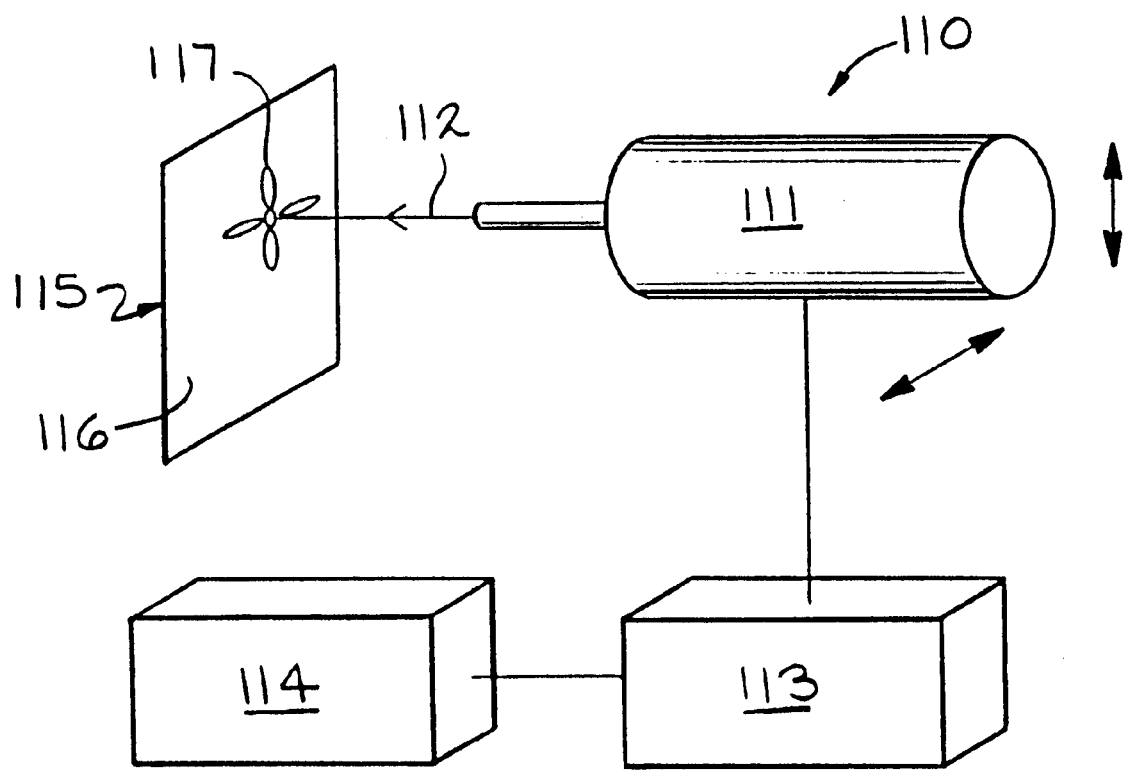
FIGS. 34 through 43 are schematic views of alternate embodiments of a laser method of forming graphics on materials according to this invention.

FIGS. 34 through 43 illustrate alternate embodiments of the laser method of forming graphics on materials according to this invention. FIG. 34 illustrates a first alternate embodiment of the method which utilizes the apparatus indicated generally at 110. The apparatus 110 includes a laser 111 which generates a laser beam 112. The laser 111 is positioned so that it can be moved in the vertical and horizontal directions. Such movement results in a corresponding movement of the laser beam 112. A drive mechanism in the form of a laser drive 113 is connected to the laser 111. The laser drive 113 is adapted to cause movement of the laser 111 in the vertical and horizontal directions. Alternatively, the laser drive 113 could cause the laser 111 to rotate vertically and horizontally on a stationary pivot.

An electronic controller such as a computer 114 is connected to the laser drive 113. The computer 114 is adapted to provide signals to the laser drive 113 to control movement of the laser 111. The computer 114 is programmed by particular software (not shown) developed to control such movement.

The laser 111 is positioned to generate a laser beam 112 in the direction of a material 115. The material 115 includes a surface 116. In operation, the laser 111 is activated and generates the laser beam 112. The laser beam 112 contacts the surface 116 of the material 115. The computer 114 provides signals to the laser drive 113. In response to the signals, the laser drive 113 causes movement of the laser 111 and the laser beam 112. Movement of the laser beam 112 in contact with the surface 116 of the material 115 causes a graphic 117 to be formed on the surface 116. The EDPUT is controlled within a predetermined range.

Figure 35:
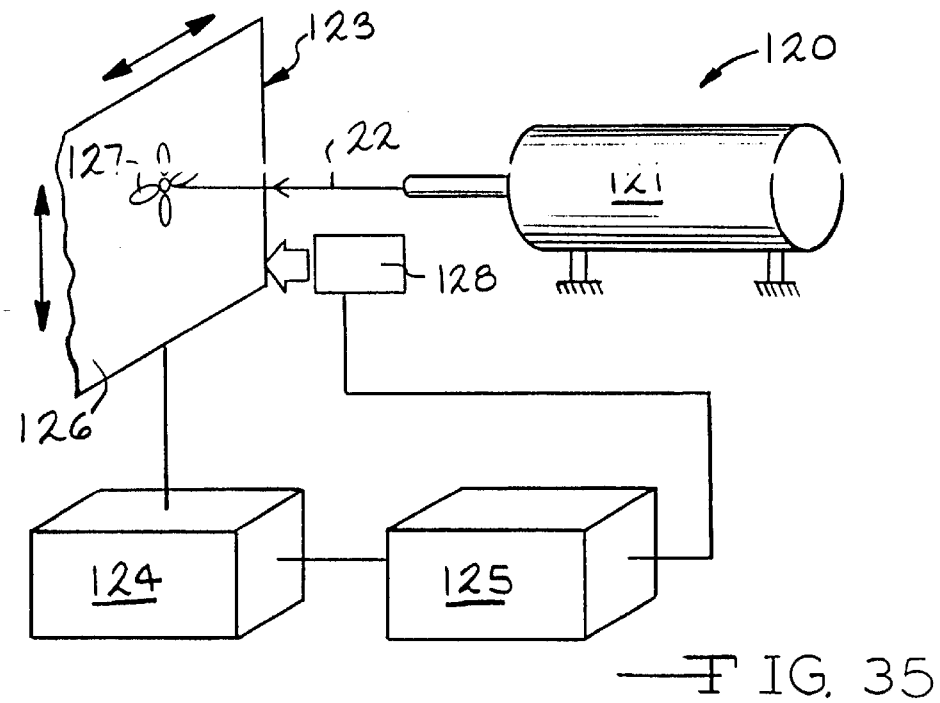

FIG. 35 illustrates a second alternate embodiment of the method which utilizes the apparatus indicated generally at 120. A laser 121 generates a laser beam 122 against the surface 126 of a material 123. A product drive 124 causes movement of the material 123 in the vertical and horizontal directions. A computer 125 provides signals to the product drive 124 to control such movement. Movement of the surface 126 of the material 123 in contact with the laser beam 122 causes a graphic 127 to be formed on the surface 126. The EDPUT is controlled within a predetermined range.

When the thickness of the material 123 varies nonuniformly, a thickness sensor 128 can continuously detect the thickness prior to contact with the laser beam 122. The thickness sensor 128 provide signals to the computer 125, and the computer 125 in turn provides signals to the product drive 124 to adjust the speed in view of the detected thickness. Such thickness sensors are common in the paper making industry.

Figure 36:
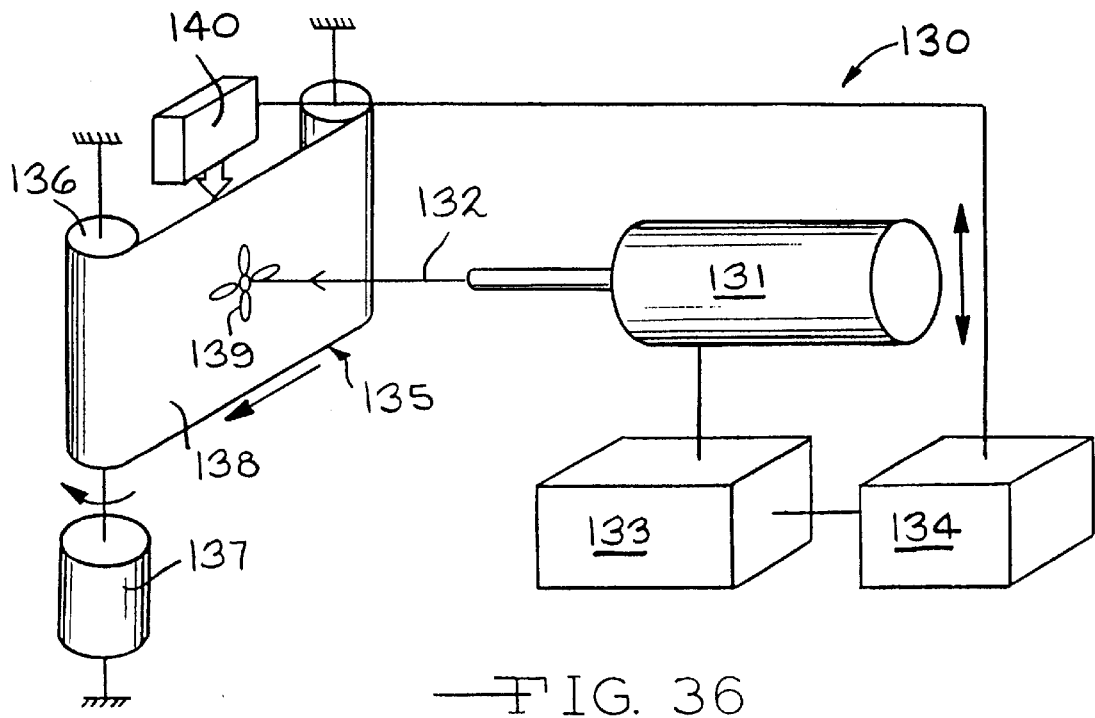

FIG. 36 illustrates a third alternate embodiment of the method which utilizes the apparatus indicated generally at 130. The third embodiment is a continuous method and as a result is more economical than the first and second embodiments. A laser 131 generates a laser beam 132 against the surface 138 of a material 135. A laser drive 133 causes movement of the laser 131 and the laser beam 132 in the vertical direction. A computer 134 provides signals to the laser drive 133 to control such movement. The material 135 is positioned on a moving roll 136. A product drive 137 causes rotation of the moving roll 136 and thus continuous movement of the material 135 in the horizontal direction. Movement of the laser beam 132 in contact with the moving surface 138 of the material 135 causes a graphic 139 to be formed on the surface 138. A thickness sensor 140 can be used with nonuniform materials. The movements and timing of the laser 131 and the moving roll 136 are coordinated to form the specific desired graphic 139 and to control the EDPUT within a predetermined range.

Figure 37:
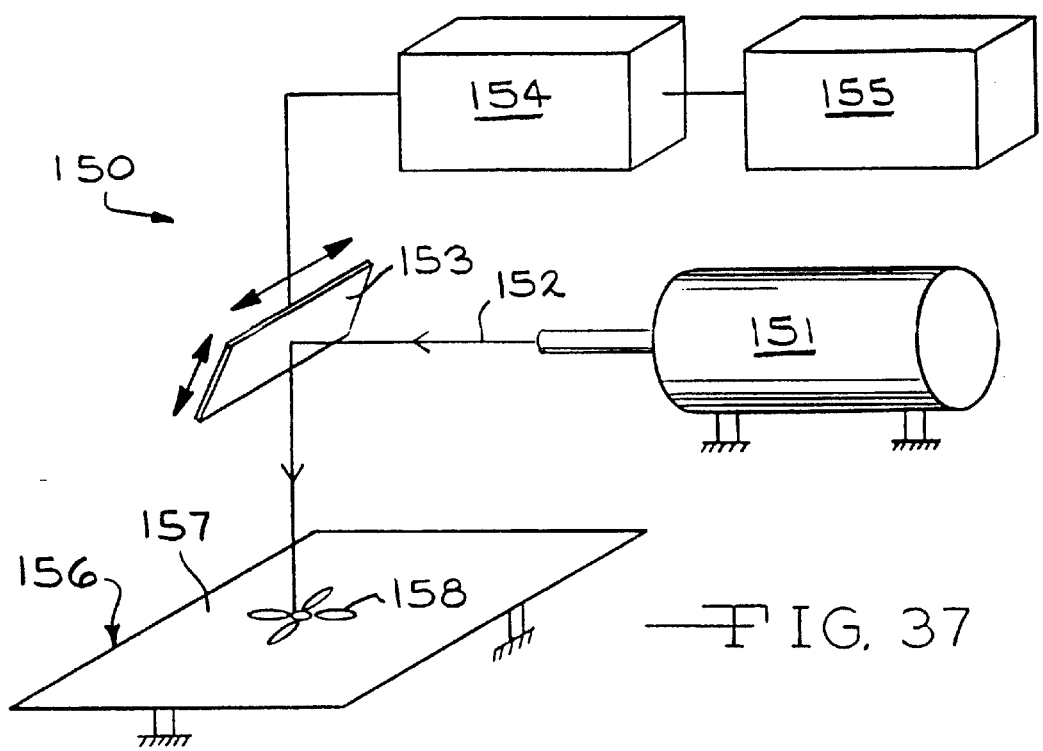

Referring now to FIG. 37, there is illustrated a fourth alternate embodiment of the method which utilizes the apparatus indicated generally at 150. A laser 151 generates a laser beam 152 in the direction of a mirror 153. A mirror drive 154 causes movement of the mirror 153 in the vertical and horizontal directions. A computer 155 provides signals to the mirror drive 154 to control such movement. The mirror 153 deflects the laser beam 152 against the surface 157 of a material 156. Movement of the laser beam 152 in contact with the surface 157 of the material 156 causes a graphic 158 to be formed on the surface 157. The movements and timing of the mirror 153 are controlled to form the specific desired graphic 158 and to control the EDPUT within a predetermined range. Two mirrors are preferred so that movement can be simultaneously controlled along both the x-axis and y-axis.

Figure 38:
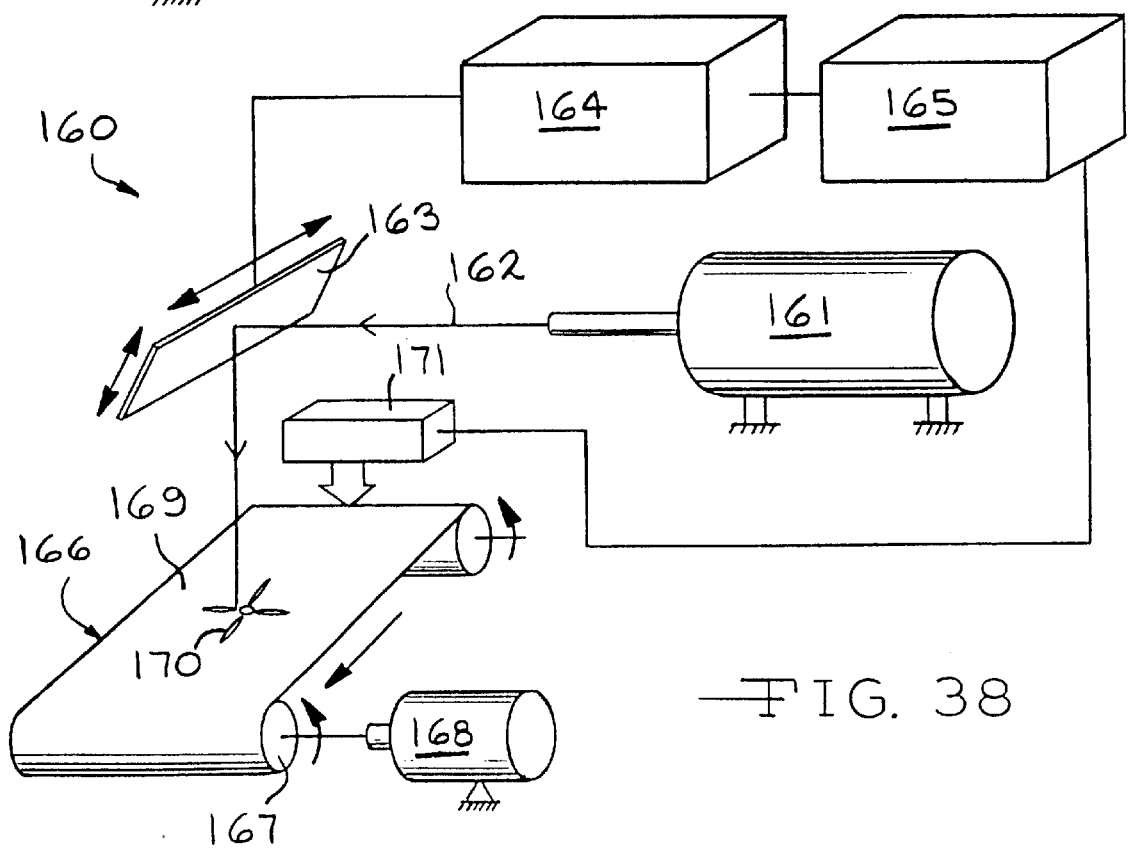

FIG. 38 illustrates a fifth alternate embodiment of the method which utilizes the apparatus indicated generally at 160. The fifth alternate embodiment combines the methods of the third and fourth alternate embodiments and is thus an even more economical method. A laser 161 generates a laser beam 162 in the direction of a mirror 163. A mirror drive 164 causes movement of the mirror 163 in the vertical and horizontal directions. Alternatively, two mirrors can be used, one moved vertically and one moved horizontally. A computer 165 provides signals to the mirror drive 164 to control such movement. The mirror 163 deflects the laser beam 162 against the surface 169 of a material 166. The material 166 is positioned on a moving roll 167. A product drive 168 causes rotation of the moving roll 167 and thus continuous movement of the material 166 in the horizontal direction. Movement of the laser beam 162 in contact with the moving surface 169 of the material 166 causes a graphic 170 to be formed on the surface 169. A thickness sensor 171 can be used with nonuniform materials. The movements and timing of the mirror 163 and the moving roll 167 are coordinated to form the specific desired graphic 170 and control the EDPUT within a predetermined range.

Figure 39:
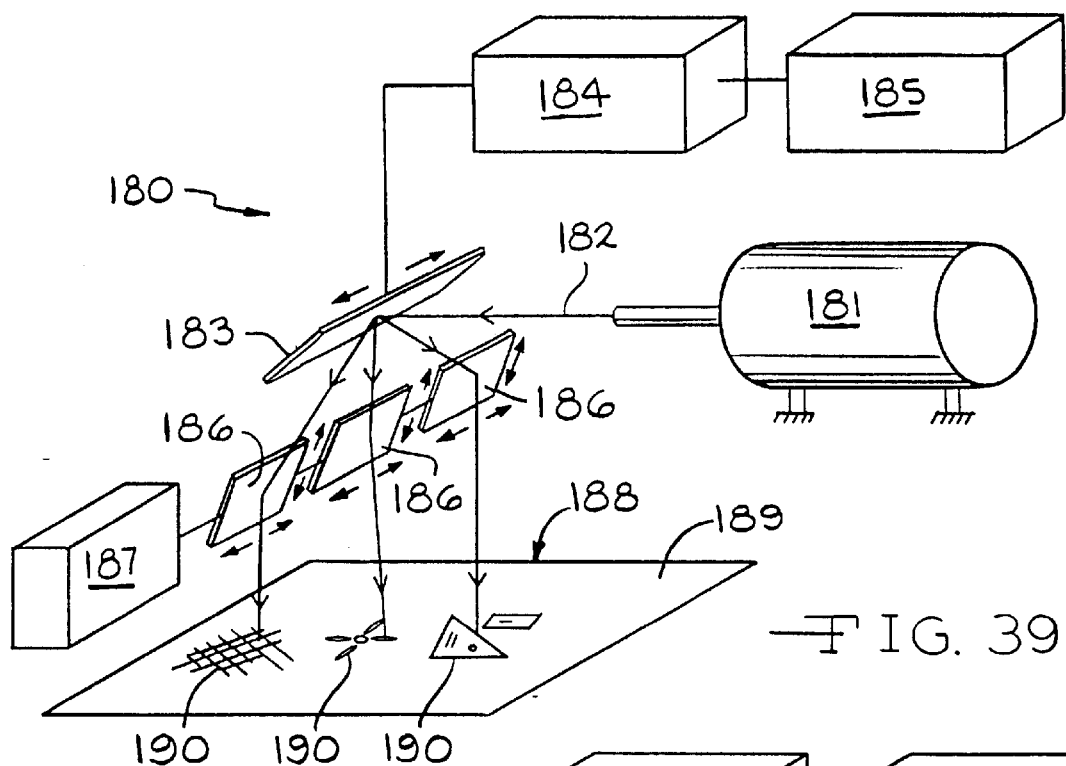

FIG. 39 illustrates a sixth alternate embodiment of the method which utilizes the apparatus indicated generally at 180. A laser 181 generates a laser beam 182 in the direction of a primary mirror 183. A primary mirror drive 184 causes movement of the primary mirror 183 in the horizontal direction. A computer 185 provides signals to the primary mirror drive 184 to control such movement. The primary mirror 183 deflects the laser beam 182 in the direction of a plurality of secondary mirrors 186. A secondary mirror drive 187 causes movement of the secondary mirrors 186 in the vertical and horizontal directions. Each secondary mirror 186 deflects the laser beam 182 against the surface 189 of a different portion of a material 188. Movement of the laser beam 182 in contact with each portion of the surface 189 of the material 188 causes a plurality of graphics 190 to be formed on the surface 189. The movements and timing of the secondary mirrors 186 are controlled to form the specific desired graphics 190 and to control the EDPUT within a predetermined range.

Figure 40:
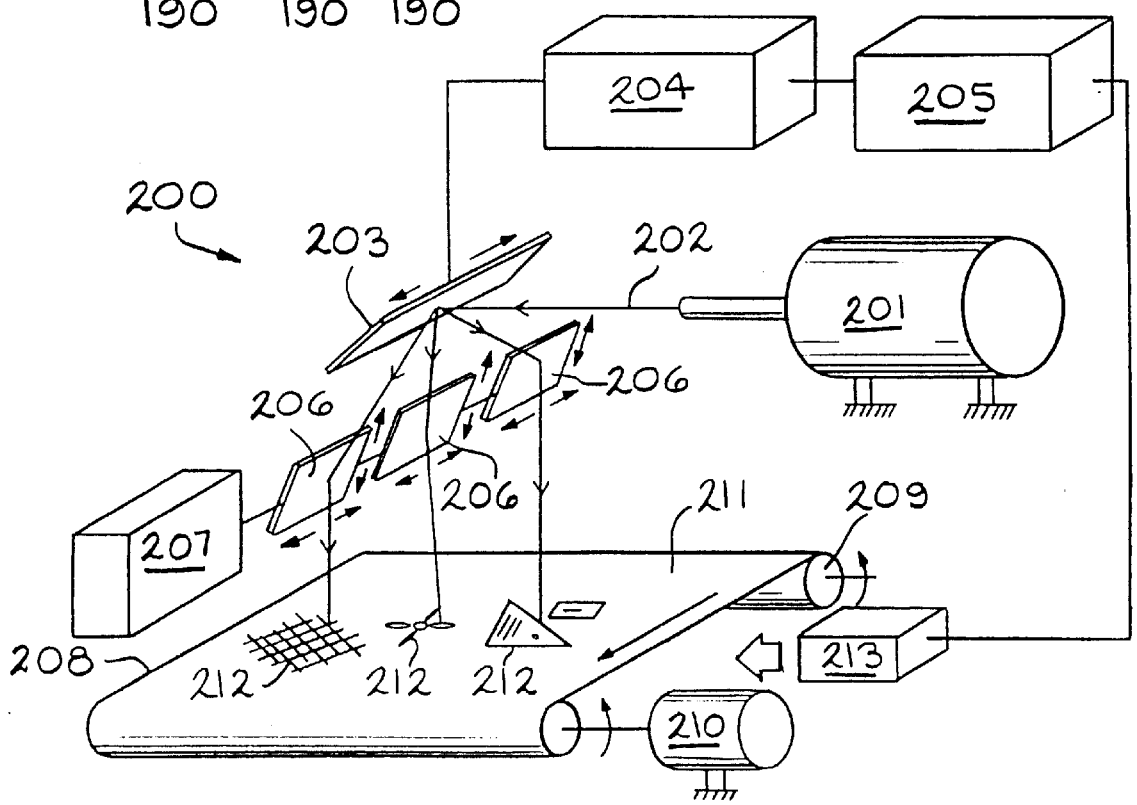

Referring now to FIG. 40, there is illustrated a seventh alternate embodiment of the method which utilizes the apparatus indicated generally at 200. A laser 201 generates a laser beam 202 in the direction of a primary mirror 203. A primary mirror drive 204 causes movement of the primary mirror 203 in the horizontal direction. A computer 205 provides signals to the primary mirror drive 204 to control such movement. The primary mirror 203 deflects the laser beam 202 in the direction of a plurality of secondary mirrors 206. A secondary mirror drive 207 causes movement of the secondary mirrors 206 in the vertical and horizontal directions. Each secondary mirror 206 deflects the laser beam 202 against the surface 211 of a different portion of a material 208. The material 208 is positioned on a moving roll 209. A product drive 210 causes rotation of the moving Toll 209 and thus continuous movement of the material 208 in the horizontal direction. Movement of the laser beam 202 in contact with each portion of the surface 211 of the moving material 208 causes a plurality of graphics 212 to be formed on the surface 211. A thickness sensor 213 can be used with nonuniform materials. The movements and timing of the secondary mirrors 206 and the moving roll 209 are coordinated to form the specific desired graphics 212 and to control the EDPUT within a predetermined range. This embodiment employing a moving roll in combination with a plurality of lenses to spread the laser beam over the material is particularly economical.

Figure 41:
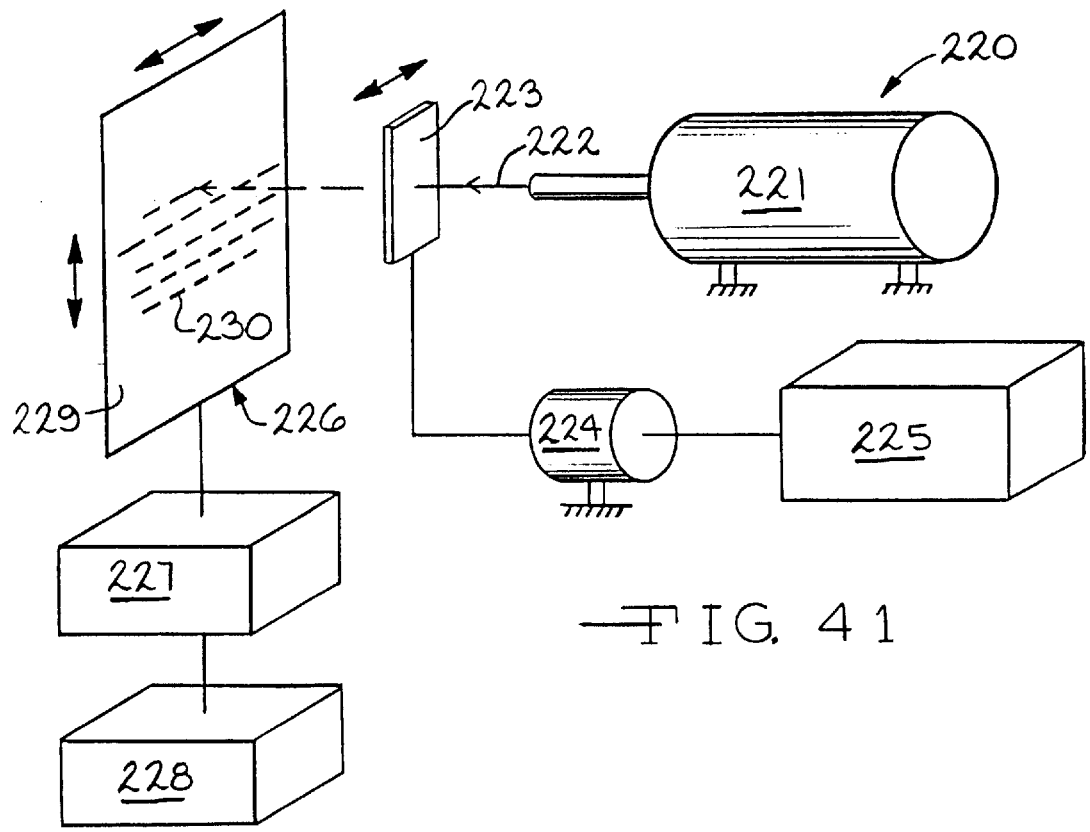

FIG. 41 illustrates an eighth alternate embodiment of the method which utilizes the apparatus indicated generally at 220. A laser 221 generates a laser beam 222 in the direction of a shutter 223. The shutter 223 periodically interrupts the laser beam 222 by swinging back and forth perpendicular to the direction of the laser beam. A shutter drive 224 causes the shutter 223 to swing back and forth. Alternatively, the shutter could be constructed and operate similar to the shutter of a camera which periodically opens and closes. A computer 225 provides signals to the shutter drive 224 to control movement of the shutter 223. The laser beam 222 is directed past the shutter 223 against the surface 229 of a material 226. A product drive 227 causes movement of the material 226 in the vertical and horizontal directions. A computer 228 provides signals to the product drive 227 to control such movement. Movement of the surface 229 of the material 226 in contact with the laser beam 222, in combination with the periodic interruption of the laser beam 222 by the shutter 223, causes a discontinuous graphic 230 to be formed on the surface 229.

Figure 42:
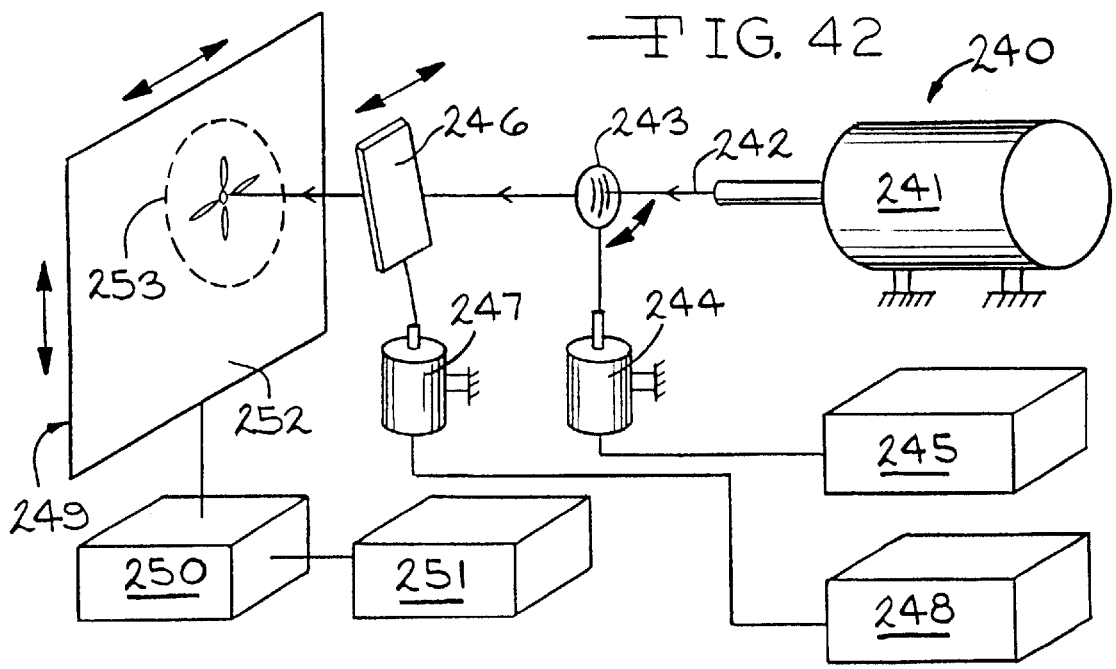

FIG. 42 illustrates a ninth alternate embodiment of the method which utilizes the apparatus indicated generally at 240. A laser 241 generates a laser beam 242 through a lens 243. The lens 243 serves to redirect the laser beam 242 in a manner that results in a more complex curved graphic. The lens 243 can be rotated for different redirections of the laser beam 242. The lens 243 can also be moved laterally or can rotate on its vertical axis for different effects, such as to create thick or thin lines. A lens drive 244 causes rotation of the lens 243. A computer 245 provides signals to the lens drive 244 to control rotation of the lens 243.

The laser beam 242 is then directed toward a shutter 246. The shutter 246 periodically interrupts the laser beam 242 by swinging back and forth perpendicular to the direction of the laser beam. A shutter drive 247 causes the shutter 246 to swing back and forth. A computer 248 provides signals to the shutter drive 247 to control such movement. The laser beam 242 is directed through the lens 243, past the shutter 246, against the surface 252 of a material 249. A product drive 250 causes movement of the material 249 in the vertical and horizontal directions. A computer 251 provides signals to the product drive 250 to control such movement. Movement of the surface 252 of the material 249 in contact with the laser beam 242, in combination with the rotation of the lens 243 and the periodic interruption of the laser beam 242 by the shutter 246, causes a graphic 253 to be formed on the surface 252. The graphic 253 includes complex continuous and discontinuous portions.

Figure 43:
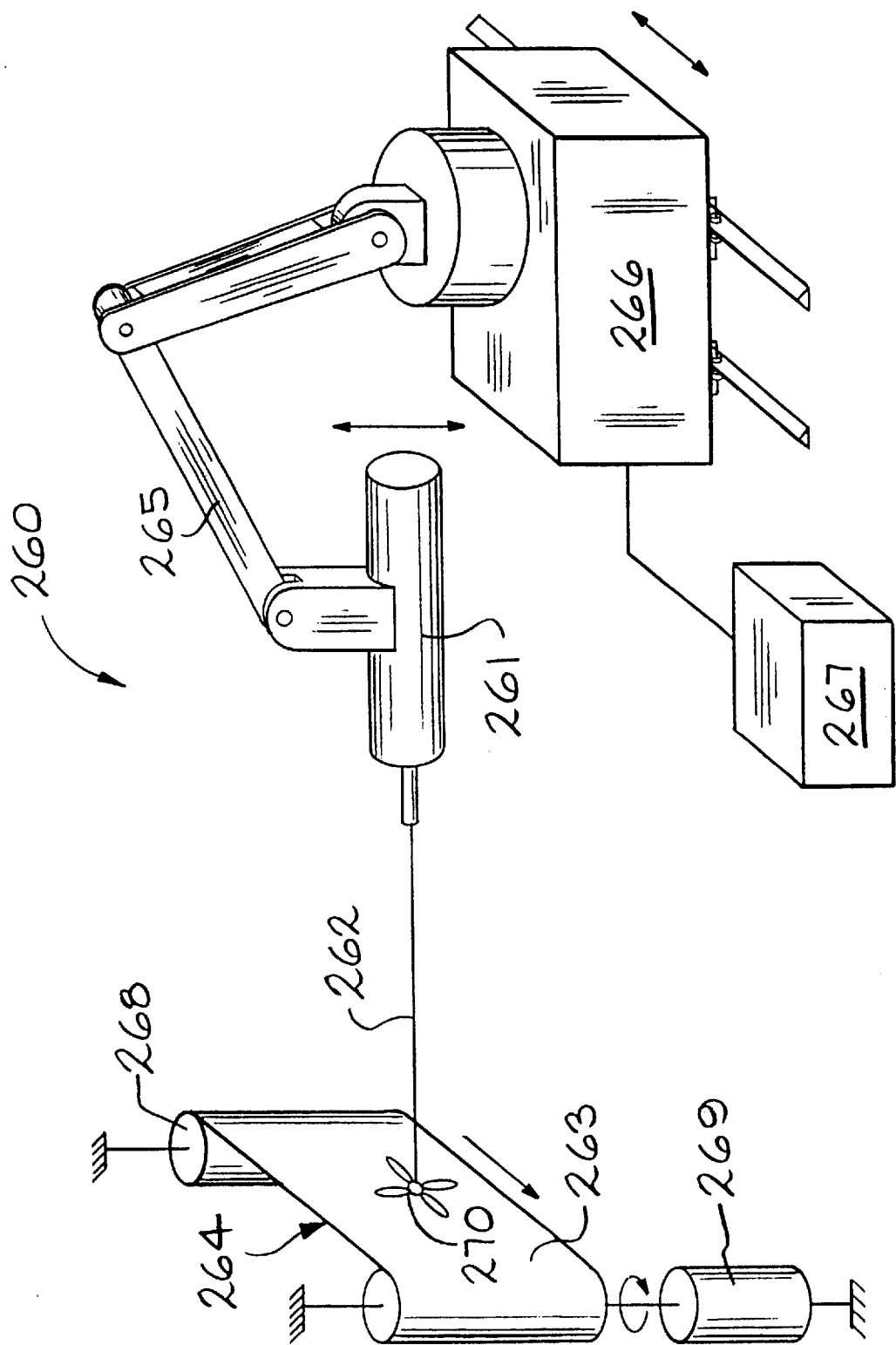

FIG. 43 illustrates a tenth alternate embodiment of the method which utilizes the apparatus indicated generally at 260. A laser 261 generates a laser beam 262 against the surface 263 of a material 264. The laser 261 is held by the arm 265 of a robot 266. Movement of the robot arm 265 causes a corresponding movement of the laser 261 and the laser beam 262. A computer 267 provides signals to the robot 266 to control such movement. The material 264 is positioned on a moving roll 268. Alternatively, the material could be stationary. A roll drive 269 causes rotation of the moving roll 268 and thus continuous movement of the material 264. Movement of the laser beam 262 in contact with the moving surface 263 of the material 264 causes a graphic 270 to be formed on the surface 263. The movements and timing of the robot arm 265 and the moving roll 268 are coordinated to form the specific desired graphic 270 and to control the EDPUT within a predetermined range. This system will be particularly useful for scribing graphics onto materials in hard to reach places or at high line speeds.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed:

1. A system which operates to form a simulated pattern on a material, comprising:
   a working surface, having an area for holding the material on which the simulated pattern is to be formed;
   a controllable laser, having command elements which command movement of an output of said laser to different locations on said working surface;
   a controller, storing a pattern which when output on said material will cause the simulated pattern, said controller operating to produce outputs indicative of the pattern, said outputs controlling said controllable laser to control a position of marking thereof according to said simulated pattern;
   wherein said simulated pattern is a simulated pattern of alternating untreated areas and areas which have been written by said laser beam so as to be faded; and
   wherein said pattern is a pattern of filled-in outline areas.

2. A system which operates to form a simulated filled-in pattern on a material, comprising:
   a working surface, having an area for holding the material on which the simulated filled-in pattern is to be formed;
   a controllable laser, having command elements which command movement of said laser and an output of said laser to different locations on said working surface, said laser operating to output a controlled energy density per unit time which energy density per unit time is based on some characteristic of the material;
   a controller, storing a computer readable pattern indicative of outlines of areas on said material which are to be formed, which when output on said material will form the simulated pattern, said controller operating to produce outputs indicative of the pattern, said outputs controlling said controllable laser to control a position of marking thereof according to said simulated pattern, and to fill-in within the outside of said simulated pattern.

3. A system as in claim 2, wherein said controlled energy density per unit time is preselected to be within a specified range for the specific material.

4. A system as in claim 2, wherein said areas are circles which are filled in to form polka dots.

5. A method of scribing a desired pattern on a material, comprising:
   obtaining an indication of the desired pattern;
   investigating the pattern to determine if the pattern includes elements which are more likely to cause undesired damage to the material when applied to the material by a laser;
   modifying the pattern to change the elements to other elements which are less likely to cause said undesired damage; and
   commanding a controllable movable laser based on the modified pattern to write to different locations on a surface of the material.

6. A method as in claim 5, further comprising controlling said laser to produce outputs indicative of the desired pattern to be formed based on said indication, said outputs controlling said controllable laser to control a position of marking thereof, said controller controlling an energy density per unit time that is output from said laser to stay within a controlled range of energy density per unit time for said material.

7. A method as in claim 6, wherein said energy density per unit time is selected within a range, said range determined based at least on said pattern as determined by said investigating.

8. A method as in claim 6, wherein said energy density per unit time is also based on both said pattern and said material.

9. A method as in claim 6, wherein said investigating comprises checking said pattern for crossing points where said laser would cross a spot on said material at least twice, and wherein said modifying comprises changing said pattern so that said crossing points do not cross.

10. A method as in claim 9, further comprising controlling said laser to produce outputs indicative of the desired pattern to be formed based on said indication, said outputs controlling said controllable laser to control a position of marking thereof, said controller controlling an energy density per unit time that is output from said laser to stay within a controlled range of energy density per unit time for said material.

11. A method of scribing a desired pattern on a material without damaging the material, comprising:
   obtaining an indication of a desired pattern to be placed on the material;
   determining a position representing a beginning portion of a portion of the desired pattern, where the laser will begin to form the desired pattern on said material,
   controlling a controllable movable laser to begin moving relative to the material, and, while moving, to begin outputting its laser beam, said laser beam not being output until after said laser is moving relative to said material, to avoid overetching of the material at startup.

12. A method as in claim 11, further comprising controlling said laser to produce outputs indicative of the desired pattern to be formed based on said indication and based on said determined energy amount, said outputs controlling said controllable laser to control a position of marking thereof, said controller controlling amount of energy per area that is applied from said laser to stay within said controlled range of energy density per unit time selected for said pattern.

13. A method of forming a desired pattern on a material without damaging the material, comprising:

obtaining an indication of a desired pattern to be formed on the material;

determining an energy amount to be applied to each unit area of said material based on at least one characteristic of said pattern;

controlling a relative movement between a marking device that produces a focused beam of radiation which will be used to mark the material, and said material;

controlling the marking device to output the focused beam of radiation toward said material, by commanding said relative movement, and then, while there is said relative movement between said marking device and said material, to begin outputting said focused beam of radiation, such that said beam of radiation is not output until after said beam is moving relative to said material, to avoid overetching of the material at startup.

14. A method as in claim 13, wherein said marking device is a controllable laser, and said focused beam of radiation is a laser beam.

15. A method as in claim 13, wherein said controlling operates to maintain said focused beam of radiation in a specified range of energy density per unit time for said material.

16. A method of scribing a desired pattern on a material without damaging the material, comprising:

obtaining an indication of a desired pattern to be placed on the material;

determining an energy amount to be applied to each unit area of said material based on at least one characteristic of said pattern;

controlling a controllable movable laser to produce an output at a specified energy amount per unit area by controlling at least one of a movement speed of said controllable movable laser and an output power of said controllable movable laser; and said controlling said controllable movable laser to begin moving relative to the material, and, while moving, to begin outputting its laser beam, such that said laser beam is not output until after said laser is moving relative to said material, to avoid overetching of the material at startup.

* * * * *